US012614016B2

(12) United States Patent
Chang et al.

(10) Patent No.: US 12,614,016 B2
(45) Date of Patent: Apr. 28, 2026

(54) INTEGRATED CIRCUIT DESIGN METHOD, SYSTEM AND COMPUTER PROGRAM PRODUCT

(71) Applicant: TAIWAN SEMICONDUCTOR MANUFACTURING COMPANY, LTD., Hsinchu (TW)

(72) Inventors: Chi-Wen Chang, Hsinchu (TW); Mao-Wei Chiu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 795 days.

(21) Appl. No.: 17/747,383

(22) Filed: May 18, 2022

(65) Prior Publication Data

US 2023/0237234 A1 Jul. 27, 2023

Related U.S. Application Data

(60) Provisional application No. 63/310,466, filed on Feb. 15, 2022, provisional application No. 63/302,671, filed on Jan. 25, 2022.

(51) Int. Cl.
*G06F 30/392* (2020.01)
*G06F 117/12* (2020.01)

(52) U.S. Cl.
CPC ........ *G06F 30/392* (2020.01); *G06F 2117/12* (2020.01)

(58) Field of Classification Search
USPC ........................ 716/110, 111, 112, 119, 122
See application file for complete search history.

(56) References Cited

U.S. PATENT DOCUMENTS

| | | | | |
|---|---|---|---|---|
| 2008/0109778 A1* | 5/2008 | Hsieh | ...................... | G06F 30/39 |
| | | | | 716/139 |
| 2010/0205573 A1* | 8/2010 | Busa | ..................... | G06F 30/398 |
| | | | | 716/55 |
| 2013/0205274 A1 | 8/2013 | Bosshart | | |
| 2015/0302135 A1 | 10/2015 | Park et al. | | |

FOREIGN PATENT DOCUMENTS

| | | |
|---|---|---|
| KR | 10-0962859 | 6/2010 |
| KR | 20170024362 | 3/2017 |
| KR | 20200037116 | 4/2020 |
| KR | 20210096043 | 8/2021 |
| TW | 200627213 | 8/2006 |
| TW | 201629815 | 8/2016 |

* cited by examiner

*Primary Examiner* — Brian Ngo
(74) *Attorney, Agent, or Firm* — Hauptman Ham, LLP

(57) ABSTRACT

A method of modifying a layout for an integrated circuit (IC) includes: selecting, in the layout, a circuit region to be scaled; setting a fixed area including a fixed feature in the selected circuit region; and scaling the selected circuit region, without scaling the fixed area including the fixed feature, to obtain a modified layout for the IC.

20 Claims, 15 Drawing Sheets

802 — generate a layout diagram

804 — make, based on the layout diagram, one or more
photolithographic exposures
OR
fabricate, based on the layout diagram, one or more masks
OR
fabricate, based on the layout diagram, one or more
components of IC

1

INTEGRATED CIRCUIT DESIGN METHOD, SYSTEM AND COMPUTER PROGRAM PRODUCT

PRIORITY CLAIM

The instant application claims the benefit of U.S. Provisional Application No. 63/302,671, filed Jan. 25, 2022, and U.S. Provisional Application No. 63/310,466, filed Feb. 15, 2022. The above-listed applications are incorporated by reference herein in their entireties.

BACKGROUND

An integrated circuit (IC) typically includes a number of semiconductor devices represented in an IC layout diagram (or layout). The IC layout diagram is generated from an IC schematic, such as an electrical diagram of the IC. At various steps during the IC design process, from the IC schematic to the IC layout diagram for actual manufacture of the IC, various checks, tests and/or layout modifications are performed to make sure that the IC can be made and will function optimally as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A-3B include schematic views of IC layouts in various scaling operations with pushed areas, in accordance with some embodiments.

DETAILED DESCRIPTION

Figure 1:
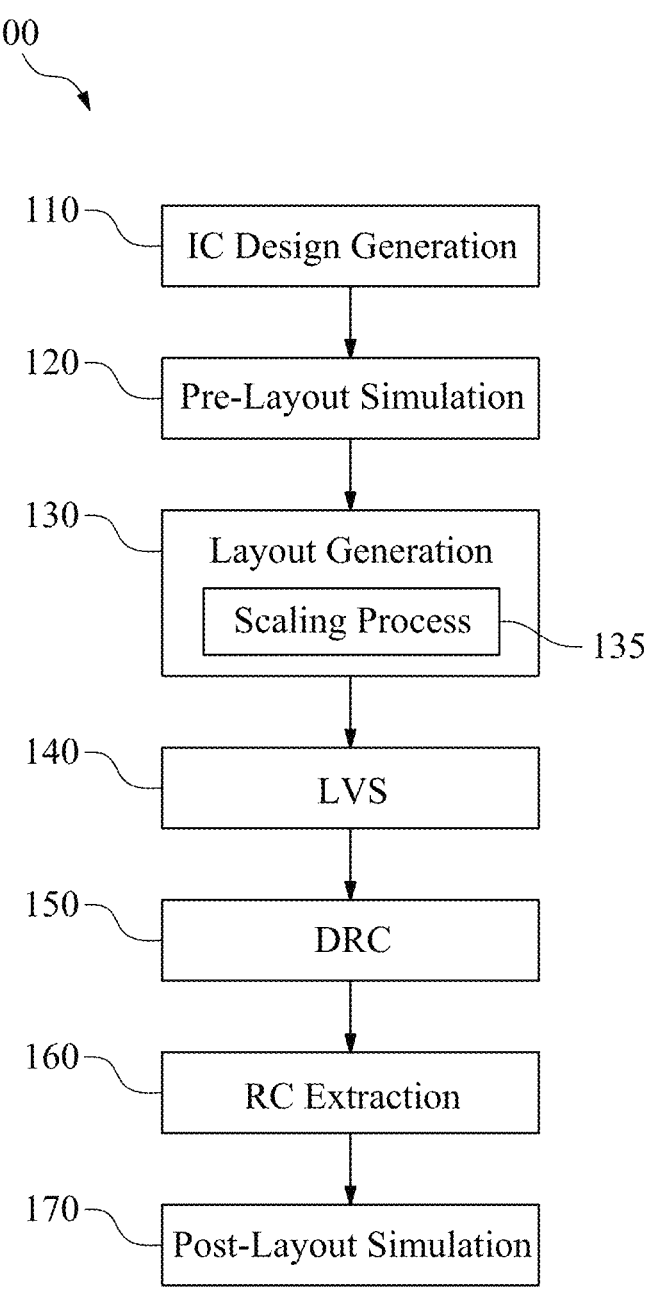
FIG. 1 is a functional flow chart of at least a portion of an IC design flow in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In an integrated circuit (IC) design process, a design of an IC is provided by a circuit designer. A layout of the IC is generated based on the design, e.g., by a placement and routing operation. Various checks and/or simulations are performed for the generated layout. When one or more of the checks or simulations indicate one or more yield and/or performance concerns, the layout is modified. In some situations, the layout is modified by scaling up (or blowing up) or scaling down (or shrinking) one or more regions of the layout.

In at least one embodiment, the process of scaling up or down a region in an IC layout comprises one or more operations before and/or after scaling the region. In some embodiments, an area associated with, or inside, or overlapping the region to be scaled is set to be a fixed area. Such a fixed area will not be scaled or moved when the region is scaled. In some embodiments, an area associated with, but outside, the region to be scaled is set to be a pushed area. Such a pushed area will be pushed, or moved, by a distance and/or in a direction corresponding to the scaling operation. In some embodiments, one or more conductive patterns coming in and/or out of the region to be scaled, i.e., crossing a boundary of the region, is disconnected along the boundary of the region. After scaling, the disconnected conductive patterns are reconnected, e.g., by a rerouting operation. In some embodiments, the rerouting operation comprises adding additional routing features, e.g., conductive patterns and/or vias, and/or modifying and/or rearranging one or more existing routing features. In at least one embodiment, one or more of the described operations are omitted. In at least one embodiment, one or more of the described operations are combined in a layout modification process. In at least one embodiment, one or some or all of the described operations are automatically performed by at least one processor.

In at least one embodiment, the described operations make it possible to modify an IC layout by scaling up a region while scaling down another region of the layout, and/or scaling up or down different regions of the layout at different scaling factors. As a result, in one or more embodiments, it is possible to perform non-uniform scaling of an IC layout, with various regions of the IC layout being individually scaled, to provide a modified layout in accordance with which ICs can be manufactured and will function optimally as designed.

FIG. 1 is a functional flow chart of at least a portion of an IC design flow 100 in accordance with some embodiments. The design flow 100 utilizes one or more electronic design automation (EDA) tools for testing a design of an IC before manufacturing the IC. The EDA tools, in some embodiments, are one or more sets of executable instructions for execution by a processor or controller or a programmed computer to perform the indicated functionality. In at least one embodiment, the IC design flow 100 is performed by a design house of an IC manufacturing system discussed herein with respect to FIGS. 9-10.

At operation 110, a design of an IC is provided by a circuit designer. In some embodiments, the design of the IC includes an IC schematic, i.e., an electrical diagram, of the IC. In some embodiments, the schematic is generated or provided in the form of a schematic netlist, such as a Simulation Program with Integrated Circuit Emphasis (SPICE) netlist. Other data formats for describing the design are usable in some embodiments.

At operation 120, a pre-layout simulation is performed, e.g., by an EDA tool, on the design to determine whether the design meets a predetermined specification. If the design does not meet the predetermined specification, the IC is redesigned. In some embodiments, a SPICE simulation is performed on the SPICE netlist. Other simulation tools are usable, in place of or in addition to the SPICE simulation, in other embodiments.

At operation 130, a layout (or layout diagram) of the IC is generated based on the design. The IC layout diagram comprises the physical positions of various circuit elements (or devices) of the IC as well as the physical positions of various nets and vias interconnecting the circuit elements. In some embodiments, the layout is generated in the form of a Graphic Design System (GDS) file by an EDA tool. Other data formats for describing the layout of the IC are within the scope of various embodiments.

In some embodiments, the IC layout diagram is generated at operation 130 by an EDA tool, such as an Automatic Placement and Routing (APR) tool. The APR tool receives the design of the IC in the form of a netlist as described herein, and performs a placement operation (or placement). For example, cells configured to provide pre-defined functions and having pre-designed layouts are stored in one or more cell libraries. The APR tool accesses various cells from one or more cell libraries, and places the cells in an abutting manner to generate an IC layout corresponding to the IC schematic. Example cells include, but are not limited to, inverters, adders, multipliers, logic gates, phase lock loops (PLLs), flip-flops, multiplexers, memory cells, or the like. Example logic gates include, but are not limited to, an AND, OR, NAND, NOR, XOR, INV, AND-OR-Invert (AOI), OR-AND-Invert (OAI), MUX, Flip-flop, BUFF, Latch, delay, clock cells, or the like. In some embodiments, a cell includes one or more active or passive circuit elements. Examples of active elements include, but are not limited to, transistors and diodes. Examples of transistors include, but are not limited to, metal oxide semiconductor field effect transistors (MOSFET), complementary metal oxide semi-conductor (CMOS) transistors, bipolar junction transistors (BJT), high voltage transistors, high frequency transistors, p-channel and/or n-channel field effect transistors (PFETs/NFETs), FinFETs, planar MOS transistors with raised source/drain, or the like. Examples of passive elements include, but are not limited to, capacitors, inductors, fuses, and resistors.

The APR tool then performs a routing operation (or routing) to route various nets and vias interconnecting the placed circuit elements. Examples of nets include, but are not limited to, conductive pads, conductive patterns, and conductive redistribution layers, or the like. The routing operation is performed to ensure that the routed interconnections satisfy a set of constraints. After the routing operation, the APR tool outputs the IC layout diagram including the placed circuit elements and the routed nets and vias. Nets and vias are commonly referred to herein as routing features. The described APR tool is an example. Other arrangements are within the scope of various embodiments. For example, in one or more embodiments, one or more of the described operations are omitted.

A scaling process 135 for locally scaling one or more regions of the layout, as described herein, is performed at operation 130, in one or more embodiments. In some embodiments, the scaling process 135 is performed automatically by an APR tool, or by the APR tool in accordance with user input.

At operation 140, a layout-versus-schematic (LVS) check, is performed. The LVS check is performed to ensure that the generated layout corresponds to the design. Specifically, an LVS checking tool, i.e., an EDA tool, recognizes electrical components as well as connections therebetween from the patterns of the generated layout. The LVS checking tool then generates a layout netlist representing the recognized electrical components and connections. The layout netlist generated from the layout is compared, by the LVS checking tool, with the schematic netlist of the design. If the two netlists match within a matching tolerance, the LVS check is passed. Otherwise, correction is made to at least one of the layout or the design by returning the process to operation 110 and/or operation 130. Other verification processes are usable in some embodiments.

At operation 150, a design rule check (DRC) is performed, e.g., by an EDA tool, on the GDS file representing the layout, to ensure that the layout satisfies certain manufacturing design rules, i.e., to ensure manufacturability of the IC. If one or more design rules is/are violated, correction is made to at least one of the layout or the design by returning the process to operation 110 and/or operation 130. Examples of design rules include, but are not limited to, a width rule which specifies a minimum width of a pattern in the layout, a spacing rule which specifies a minimum spacing between adjacent patterns in the layout, an area rule which specifies a minimum area of a pattern in the layout, a metal-to-via spacing rule which specifies a minimum spacing between a metal pattern and an adjacent via, a metal-to-metal spacing rule, a polysilicon-to-oxide defini-tion (PO-to-OD) spacing rule, a PO-to-PO spacing rule, or the like. Other verification processes are usable in some embodiments.

At operation 160, a resistance and capacitance (RC) extraction is performed, e.g., by an EDA tool, to determine parasitic parameters, e.g., parasitic resistance and parasitic capacitance, of interconnects in the IC layout for timing simulations in a subsequent operation. Other verification processes are usable in some embodiments.

At operation 170, a post-layout simulation is performed by a simulation tool, i.e., an EDA tool, to determine, taking the extracted parasitic parameters into account, whether the layout meets a predetermined specification. If the simulation indicates that the layout does not meet the predetermined specification, e.g., if the parasitic parameters cause undesirable delays, correction is made to at least one of the layout or the design by returning the process to operation 110 and/or operation 130. Otherwise, the layout is passed to manufacture or additional verification processes.

In some embodiments, one or more evaluations, checks and/or simulations indicate one or more yield and/or performance concerns, and a determination is made to modify the layout by scaling up or scaling down one or more regions of the layout. In an example, the post-layout simulation in operation 170 indicates that a region of the layout is to be scaled. In further examples, an indication or determination to scale a region of a layout is made by other operations in the IC design process, and/or by another automated system in the semiconductor device manufacturing process and/or equipment, and/or by a user. When a decision to locally scale at least one region of the layout is generated or received, the scaling process 135 is performed, e.g., by the APR tool, to scale the at least one region of the layout to obtain a modified layout. The modified layout is subjected to one or more checks and/or simulations, for example, as described with respect to operations 140-170. When the modified layout does not meet one or more requirements at operations 140-170, the process is returned to operation 130 for further layout modifications, with subsequent checks and verifications as described herein. In some embodiments, the layout before modification and/or the modified layout are stored in a non-transitory computer-readable medium.

In some embodiments, one or more of the described operations are omitted. In an example, the RC extraction in operation 160 and the post-layout simulation in operation 170 are omitted, in one or more embodiments. In a further example, the pre-layout simulation in operation 120 or the post-layout simulation in operation 170 is omitted, in one or more embodiments. In yet another example, operations 110, 120 and the initial layout generation at operation 130 are omitted, an existing IC layout is loaded into an APR tool and is directly subjected to the scaling process 135. Other arrangements are within the scopes of various embodiments.

For simplicity, various operations and/or determinations are described herein as being performed by an APR tool. However, in at least one embodiment, one or more of the described operations and/or determinations are performed outside an APR tool, e.g., by one or more further automated systems, one or more processors, and/or one or more computer systems.

Figure 2A:
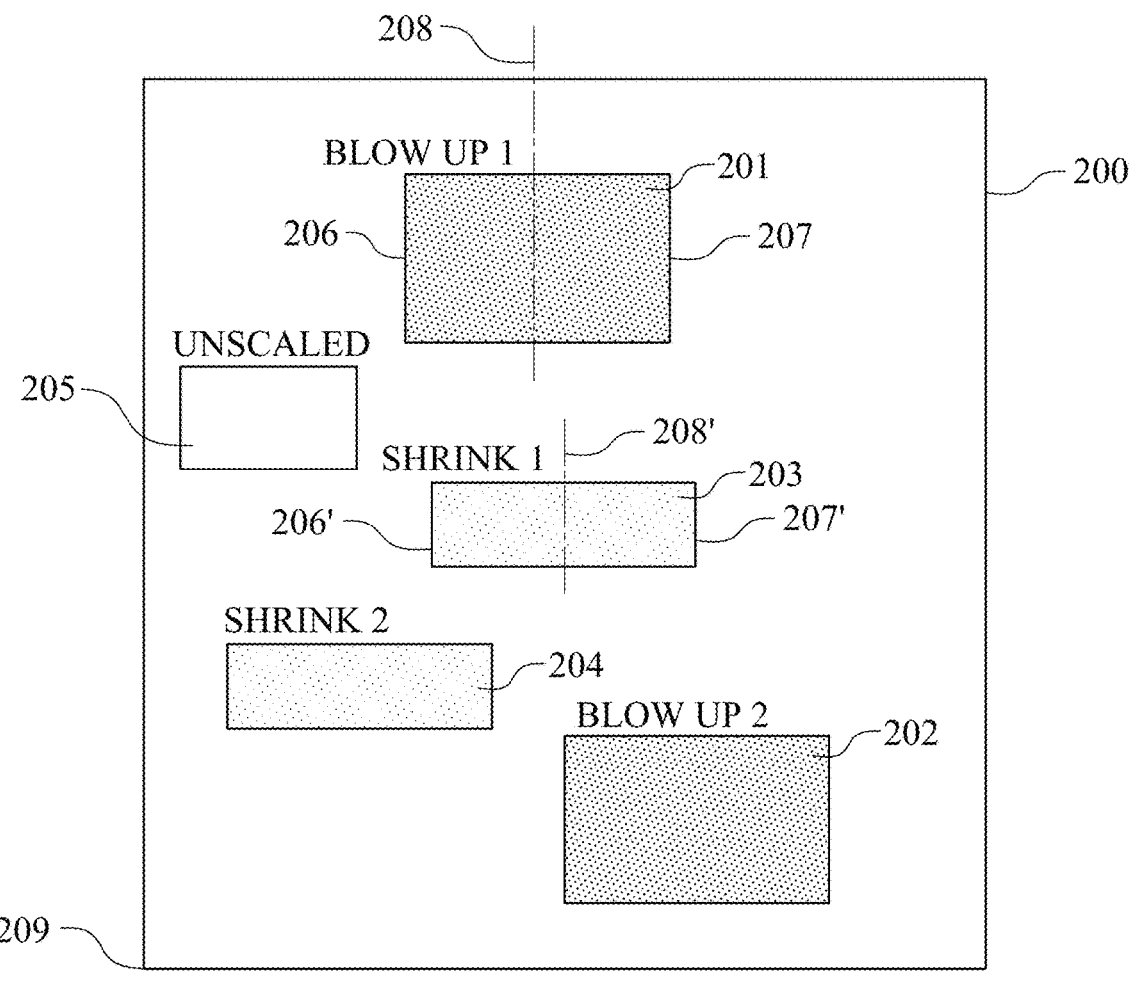
FIG. 2A is a schematic view of an IC layout of an IC with various circuit regions, in accordance with some embodiments.
Figure 2A:
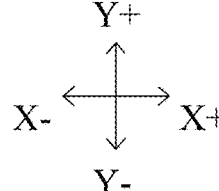

FIG. 2A is a schematic view of an IC layout 200 of an IC with various circuit regions, in accordance with some embodiments.

In the example configuration in FIG. 2A, the IC layout 200 comprises a plurality of circuit regions 201, 202, 203, 204, 205. For simplicity, one or more other circuit regions of the IC layout 200 are omitted from FIG. 2A. For example, in one or more embodiments, one or more buffer zones (not shown) are arranged between adjacent circuit regions. The circuit regions 201-205 are arranged in the IC layout 200 along an X-axis and a Y-axis. The Y-axis is transverse to the X-axis. In some embodiments, the Y-axis is perpendicular to the X-axis. The X-axis is schematically illustrated in FIG. 2A as having an X+ direction and an opposite X− direction. The Y-axis is schematically illustrated in FIG. 2A as having a Y+ direction and an opposite Y− direction. The described number and/or arrangement of circuit regions in the IC layout 200 are examples. Other numbers and/or arrangements of circuit regions in the IC layout 200 are within the scopes of various embodiments. In some embodiments, an IC corresponding to the IC layout 200 includes circuitry corresponding to the circuit regions 201-205 formed on a substrate, for example, as described with respect to FIG. 2D.

In some embodiments, at least one of the circuit regions 201-205 comprises a cell, or a set of cells, read from one or more cell libraries, placed in the IC layout 200 and routed as described herein. In some embodiments, at least one of the circuit regions 201-205 comprises an intellectual property (IP) block. An IP block comprises a cell or a combination of cells developed by an IC designer (also referred to as "IP provider"). In some situations, an IP designer is a fabless design house or design company which designs, but does not manufacture, IC devices. In some situations, an IP designer is a foundry that designs and manufactures IC devices. An IP designer develops various IP blocks with corresponding different functions, and stores the developed IP blocks in an IP library. Different IC designers develop different IP libraries. It is possible that the same component with the same function is developed by different IC designers and corresponds to different IP blocks. IP blocks are reusable and selectable by a user to integrate the selected IP blocks into an IC device. It is possible that a user selects IP blocks from different IP designers or IP libraries to be integrated into an IC device. In some embodiments, at least one of the circuit regions 201-205 comprises a non-IP block. A non-IP block comprises a cell or a combination of cells, but is not retrieved from an IP library. For example, a non-IP block is built from standard cells retrieved from a standard library, and/or developed specifically for a particular IC device. Examples of IP blocks and/or non-IP blocks include, but are not limited to, memories, memory control logics, caches, resistor arrays, capacitor arrays, communications interfaces, application programming interfaces (APIs), analog to digital (A/D) converters, radio frequency tuners, digital signal processors (DSPs), graphics processing units (GPUs), arithmetic logic units (ALUs), floating-point units (FPUs), central processing units (CPUs), or the like. The circuit regions 201-205 are arranged in the IC layout 200 along an X-axis and a Y-axis. The X-axis is schematically illustrated in FIG. 2A as having an X+ direction and an opposite X− direction. The Y-axis is schematically illustrated in FIG. 2A as having a Y+ direction and an opposite Y− direction.

In the example configuration in FIG. 2A, the circuit regions 201, 202 are determined to be scaled-up, the circuit regions 203, 204 are determined to be scaled-down, and the circuit region 205 is not determined to be scaled-up or scaled-down. The circuit regions 201, 202 to be scaled-up are correspondingly designated as BLOW UP 1 and BLOW UP 2, the circuit regions 203, 204 to be scaled-down are correspondingly designated as SHRINK 1 and SHRINK 2, and the circuit region 205 is designated as UNSCALED in FIG. 2A. The labels BLOW UP 1, BLOW UP 2, SHRINK 1, SHRINK 2, and UNSCALED are for illustrative purposes, and are not included in the IC layout 200, in one or more embodiments. The determinations whether to scale up or down a circuit region and by how much (e.g., the scaling factor) are made by an automated system and/or by a user (e.g., a layout engineer) based on one or more factors as described herein, including, but not limited to, evaluations, checks, simulations yield and/or performance concerns, or the like. In some embodiments, at least one of the circuit regions 201, 202, 203, 204 is generated by an automated system, e.g., by generating devices with a specific gate pattern pitch as described herein. In at least one embodiment, at least one of the circuit regions 201, 202, 203, 204 is generated by a user, e.g., a layout engineer, who uses a marker layer or a specific layer to provide the circuit region.

Each of the circuit regions 201, 202, 203, 204 is to be scaled along at least one of the X-axis or the Y-axis. An example of a scaling operation for scaling-up the circuit region 201 along the X-axis, includes keeping an edge 206 of the circuit region 201 fixed, while stretching or moving an opposite edge 207 of the circuit region 201 along the X+ direction which is the scaling direction in this example. Another example of a scaling operation for scaling-up the circuit region 201 along the X-axis includes keeping the opposite edge 207 of the circuit region 201 fixed, while stretching or moving the edge 206 of the circuit region 201 along the X– direction which is the scaling direction in this example. A further example of a scaling operation for scaling-up the circuit region 201 along the X-axis includes keeping a predetermined reference line 208 of the circuit region 201 fixed, while stretching or moving both edges 206, 207 of the circuit region 201 correspondingly along the X+ direction and X– direction which are the scaling directions in this example.

In some embodiments, a feature of a circuit region, or the circuit region itself, is considered fixed when a relative position of the feature or the circuit region with respect to a predetermined reference point of the IC layout containing the circuit region is unchanged, even after a scaling operation. For example, a feature (e.g., the edge 206, 207, or reference line 208, or any other feature) of the circuit region 201, or the circuit region 201 itself, is considered fixed when a relative position of the feature or the circuit region 201 with respect to a predetermined reference point 209 of the IC layout 200 is unchanged even after a scaling operation. In at least one embodiment, the reference point 209 is a coordinate origin of a coordinate system associated with the IC layout 200. In the example configuration in FIG. 2A, the reference point 209 is a corner of the IC layout 200, and the reference line 208 is an X-axis center line that bisects a width of the circuit region 201 along the X-axis. Other reference point and/or reference line arrangements are within the scopes of various embodiments.

In at least one embodiment, the circuit region 201 is scaled-up along the Y-axis in one or more manners similar to those described with respect to scaling-up the circuit region 201 along the X-axis. In at least one embodiment, the circuit region 201 is scaled-up along both the X-axis and Y-axis. As a result of a scaling operation, a size of a circuit region is changed. For example, when a circuit region is scaled-up or scaled-down along either the X-axis or the Y-axis, a width of the circuit region along the X-axis or the Y-axis is correspondingly increased or decreased. A ratio of the size or width of the circuit region after the scaling operation to the size or width of the circuit region before the scaling operation is sometimes referred to as the scaling factor of the scaling operation. Other definitions of a scaling factor are within the scopes of various embodiments. In at least one embodiment, the circuit region 201 is scaled-up along both the X-axis and Y-axis at the same scaling factor. In at least one embodiment, the circuit region 201 is scaled-up along both the X-axis and Y-axis at different scaling factors.

The circuit region 202 is scaled-up along the X-axis and/or the Y-axis in one or more manners similar to those described with respect to the circuit region 201. In some embodiments, the circuit regions 201, 202 are scaled-up at the same scaling factor and/or scaling direction. In at least one embodiment, the circuit regions 201, 202 are scaled-up at different scaling factors and/or different scaling direction.

An example of a scaling operation for scaling-down the circuit region 203 along the X-axis, includes keeping an edge 206' of the circuit region 203 fixed, while contracting or moving an opposite edge 207' of the circuit region 203 along the X– direction, with the X+ direction being the scaling direction in this example. Another example of a scaling operation for scaling-down the circuit region 203 along the X-axis includes keeping the opposite edge 207' of the circuit region 203 fixed, while contracting or moving the edge 206' of the circuit region 203 along the X+ direction, with the X– direction being the scaling direction in this example. A further example of a scaling operation for scaling-down the circuit region 203 along the X-axis includes keeping a predetermined reference line 208', e.g., an X-axis center line, of the circuit region 203 fixed, while contracting or moving both edges 206', 207' of the circuit region 203 correspondingly along the X+ direction and X– direction which are the scaling directions in this example.

In at least one embodiment, the circuit region 203 is scaled-down along the Y-axis in one or more manners similar to those described with respect to scaling-down the circuit region 203 along the X-axis. In at least one embodiment, the circuit region 203 is scaled-down along both the X-axis and Y-axis at the same scaling factor. In at least one embodiment, the circuit region 203 is scaled-down along both the X-axis and Y-axis at different scaling factors.

The circuit region 204 is scaled-down along the X-axis and/or the Y-axis in one or more manners similar to those described with respect to the circuit region 203. In some embodiments, the circuit regions 203, 204 are scaled-down at the same scaling factor and/or scaling direction. In at least one embodiment, the circuit regions 203, 204 are scaled-down at different scaling factors and/or scaling directions.

As described herein, the size of each of the circuit regions 201-204 is changed after a corresponding scaling operation. In contrast, the size of the circuit region 205, which is unscaled despite the scaling operations of the circuit regions 201-204, is unchanged. In at least one embodiment, despite the scaling operations of the circuit regions 201-204, the unscaled circuit region 205 remains fixed with respect to the reference point 209, as described herein. In at least one embodiment, the unscaled circuit region 205 is moved or pushed along a scaling direction of a scaling operation of another circuit region.

In some embodiments, a user interface, e.g., a screen on a display device or monitor of an EDA tool, is shown to a user, in a scaling process, e.g., the scaling process 135. The user interface shows a layout, or a portion of the layout, being subjected to the scaling process, while highlighting one or more circuit regions to be scaled. For example, the user interface shows a view similar to that of FIG. 2A in which the circuit regions 201-204 are visually presented in formats different from that of other unscaled circuit regions, including the unscaled circuit region 205. In a non-limiting example, the circuit regions 201, 202 to be scaled-up are shown in a first color, the circuit regions 203, 204 to be scaled-down are shown in a second color distinctive from the first color, and the other unscaled circuit regions including the unscaled circuit region 205 are shown in a third color distinctive from both the first color and the second color. As a result, in one or more embodiments, it is possible for a user, e.g., a layout engineer, to quickly and/or easily to see the circuit region(s) to be scaled up and/or down, and to provide appropriate user inputs and/or correction when prompted by and/or requested by the automated system, e.g., an APR tool. The described color scheme as a way to highlight circuit regions to be scaled is an example. Any other schemes with visually distinctive formats are within the scopes of various embodiments. For example, one or more of transparency, blinking or other animations, different shadows, different backgrounds or borders, other visual effects, or the like, are usable to highlight and/or visually distinguish circuit regions to be scaled from unscaled circuit regions in the same layout.

Figure 2B:
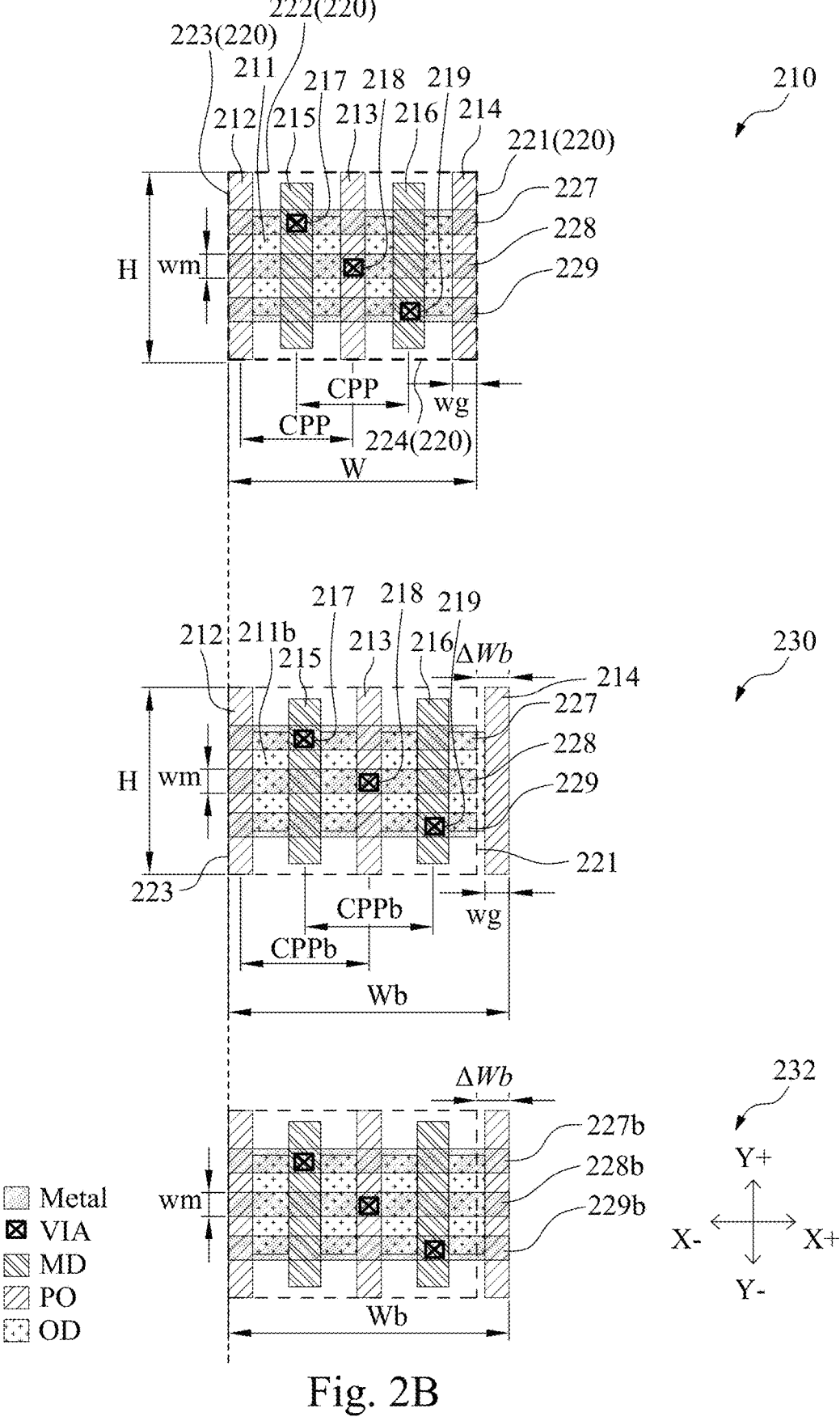
FIGS. 2B-2C include schematic views of a circuit region of an IC layout at several stages in various scaling operations, in accordance with some embodiments.

FIG. 2B includes schematic views of a circuit region 210 of an IC layout at several stages in a scaling-up operation along the X-axis, in accordance with some embodiments. In some embodiments, the circuit region 210 corresponds to at least one of the circuit regions 201, 202, and/or the IC layout corresponds to the IC layout 200. In FIG. 2B, the top view shows the circuit region 210 before scaling, the middle view shows an intermediate circuit region 230 corresponding to the circuit region 210 after scaling and some routing modification, and the bottom view shows a modified circuit region 232 corresponding to the intermediate circuit region 230 after further routing modification.

The circuit region 210 comprises one or more active regions extending along a first direction, e.g., the X-axis, and one or more gate patterns extending across the one or more active regions and along a second direction, e.g., the Y-axis, transverse to the first direction. For simplicity, in the example configuration in FIG. 2B, the circuit region 210 is illustrated as comprising an active region 211, and gate patterns 212, 213, 214 extending across the active region 211. The described and/or illustrated numbers of active regions and/or gate patterns are example. Other numbers of active regions and/or gate patterns are within the scopes of various embodiments. Active regions are sometimes referred to as oxide-definition (OD) regions, and are schematically illustrated in the drawings with the label "OD." The X-axis is sometimes referred to as the OD direction. The active region 211 in a manufactured IC corresponding to the layout include P-type dopants and/or N-type dopants. The gate patterns 212-214 in an IC corresponding to the layout include a conductive material, such as, polysilicon, and is schematically illustrated in the drawings with the label "PO." The Y-axis is sometimes referred to as the Poly direction. Other conductive materials for the gate patterns, such as metals, are within the scope of various embodiments.

The one or more active regions and the one or more gate patterns of the circuit region 210 together form one or more circuit elements. For simplicity, in the example configuration in FIG. 2B, the circuit region 210 is illustrated as comprising a transistor configured by the active region 211 and the gate pattern 213. The gate pattern 213 corresponds to a gate of the transistor. Areas of the active region 211 on opposite sides of the gate pattern 213 correspond to source/drain regions (not numbered) of the transistor. In some embodiments, at least one of the gate patterns 212, 214 corresponds to a gate terminal of another transistor in the layout. In at least one embodiment, at least one of the gate patterns 212, 214 corresponds to a dummy gate pattern. The gate pattern 213 is an example of "functional gate patterns" which, together with the underlying active regions, configure transistors and/or are electrically coupled to one or more other circuit elements. Unlike functional gate patterns, dummy gate patterns, or non-functional gate patterns, are not configured to form transistors together with underlying active regions, and/or one or more transistors formed by dummy gate patterns together with the underlying active regions are not electrically coupled to other circuit elements. In at least one embodiment, dummy gate patterns include dielectric material in a manufactured IC.

In the circuit region 210, the gate patterns, including dummy gate patterns and functional gate patterns, are arranged at a regular gate pattern pitch CPP. A gate pattern pitch CPP is a center-to-center distance along the X-axis between adjacent gate patterns. For example, as illustrated in FIG. 2B, a distance along the X-axis between a centerline (not numbered) of the gate pattern 212 and a centerline (not numbered) of the adjacent gate pattern 213 is gate pattern pitch CPP. In some embodiments, a circuit region is scaled up by increasing the gate pattern pitch of the gate patterns in the circuit region, and is scaled down by decreasing the gate pattern pitch of the gate patterns in the circuit region, as described herein. Each of the gate patterns in the circuit region 210, including functional and dummy gate patterns, has a gate pattern width wg, for example, as illustrated for the gate pattern 214 in FIG. 2B.

The circuit region 210 further comprises contact structures over and in electrical contact with the corresponding source/drain regions in the active regions of the circuit region 210. Contact structures are sometimes referred to as metal-to-device structures, and are schematically illustrated in the drawings with the label "MD." An MD contact structure, in a manufactured IC, includes a conductive material formed over a corresponding source/drain region in the corresponding active region to define an electrical connection from one or more devices formed in the active region to other circuitry. An example conductive material of MD contact structures in a manufactured IC includes metal. Other materials are within the scopes of various embodiments. In the example configuration in FIG. 2B, MD contact structures 215, 216 are over and in electrical contact with the corresponding source/drain regions in the active region 211. The MD contact structures 215, 216 extend along the Y-axis. The MD contact structures and gate patterns (including functional and dummy gate patterns) are arranged alternatingly along the X-axis. A pitch between adjacent MD contact structures is the same as the gate pattern pitch CPP between adjacent gate patterns. For example, as illustrated in FIG. 2B, a distance along the X-axis between a centerline (not numbered) of the MD contact structure 215 and a centerline (not numbered) of the adjacent MD contact structure 216 is the same as gate pattern pitch CPP.

The circuit region 210 further comprises vias over and in electrical contact with the corresponding gate patterns or MD contact structures. A via over and in electrical contact with an MD contact structure is sometimes referred to as via-to-device (VD). A via over and in electrical contact with a gate pattern is sometimes referred to as via-to-gate (VG). In the example configuration in FIG. 2B, a VG via 218 is over and in electrical contact with the gate pattern 213, and VD vias 217, 219 are correspondingly over and in electrical contact with the MD contact structures 215, 216. An example material of VD and VG vias in a manufactured IC includes metal. Other materials are within the scopes of various embodiments.

The circuit region 210 further comprises one or more metal layers and via layers sequentially and alternatingly arranged over the VD and VG vias. The lowermost metal layer immediately over and in electrical contact with the VD and VG vias is a metal-zero (M0) layer. In other words, the M0 layer is the lowermost metal layer over, or the closest metal layer to, the active regions. A next metal layer immediately over the M0 layer is a metal-one (M1) layer, or the like. A via layer Vn is arranged between and electrically couple the Mn layer and the Mn+1 layer, where n is an integer from zero and up. For example, a via-zero (V0) layer is the lowermost via layer which is arranged between and electrically couple the M0 layer and the M1 layer. Other via layers are V1, V2, or the like. In the example configuration in FIG. 2B, M0 conductive patterns 227, 228, 229 are illustrated as being included in the circuit region 210. The M0 conductive patterns 227, 228, 229 are correspondingly over and in electrical contact with the vias 217, 218, 219. The M0 conductive patterns 227, 228, 229 are elongated along the X-axis, and each have a metal width wm along the Y-axis. In another metal layer, e.g., the M1 layer (not shown in FIG. 2B), conductive patterns are elongated along the Y-axis, and each conductive pattern has a metal width wm along the X-axis. In some embodiments, the conductive patterns 227, 228, 229 serve as examples of conductive patterns in an even metal layer, e.g., M2, M4, or the like, and the vias 217, 218, 219 serve as examples of vias in an odd via layer, e.g., V1, V3 or the like. In some embodiments, the circuit region 210 includes conductive patterns and/or vias of other metal layers and/or via layers which are omitted in FIG. 2B for simplicity. The described and illustrated configuration of various features such as active regions, gate patterns, MD contact structures, conductive patterns, and vias is an example. Other configurations are within the scopes of various embodiments.

The circuit region 210 comprises a boundary 220 within which various circuit elements and/or conductive patterns and/or vias of the circuit region 210 are arranged. In the example configuration in FIG. 2B, the boundary 220 is rectangular and comprises edges 221, 222, 223, 224. The described shape and number of edges of the boundary 220 are examples. Other configurations are within the scopes of various embodiments. In some embodiments, in a place-and-route operation, e.g., the operation 130 performed by an APR tool as described herein, cells and/or circuit regions are placed in an IC layout in abutment with each other along their respective boundaries. For example, the circuit region 210 is placeable in abutment with one or more other cells or circuit regions along the X-axis at one or more of the edges 221, 223. Additionally or alternatively, the circuit region 210 is placeable in abutment with one or more other cells or circuit regions along the Y-axis at one or more of the edges 222, 224. In some embodiments, one or more of the edges 221, 222, 223, 224 are not placed in abutment with another cell or circuit regions of the IC layout.

A size of the circuit region 210 is defined by the boundary 220. For example, the circuit region 210 has a width W along the X-axis as a distance between the edges 221, 223 of the boundary 220, and a height H along the Y-axis as a distance between the edges 222, 224 of the boundary 220. In the example configuration in FIG. 2B, the edges 221, 223 correspondingly coincide with outer edges of the gate patterns 212, 214. Other configurations are within the scopes of various embodiments. For example, in at least one embodiment, the edges 221, 223 correspondingly coincide with centerlines of the gate patterns 212, 214.

In some embodiments, a scaling-up (or blowing-up) operation of a circuit region along the X-axis comprises increasing the gate pattern pitch of the circuit region to a greater gate pattern pitch. For example, as illustrated at the middle view in FIG. 2B, the gate pattern pitch CPP of the circuit region 210 is increased to a new gate pattern pitch CPPb which is greater than the gate pattern pitch CPP. A scaling factor of the scaling-up operation is the ratio CPPb/CPP which is greater than 1. In an example, a circuit region is scaled-up by up to about 10%, resulting in the scaling factor in a range from greater than 1 to about 1.1. In the example configuration in FIG. 2B, the scaling direction is the X+ direction, and the edge 223 of the boundary 220 of the circuit region 210 is fixed. However, other manners for scaling-up the circuit region 210 are within the scopes of various embodiments, as described with respect to FIG. 2A.

In some embodiments, information corresponding to at least one of the new gate pattern pitch CPPb or the scaling factor CPPb/CPP is input, automatically from an automated system and/or manually by a user, to an APR tool. Based on the input information, the APR tool obtains the new gate pattern pitch CPPb and performs a re-placement of circuit elements (or devices) of the circuit region 210 at the new gate pattern pitch CPPb along the X-axis. In the re-placement, the devices of the circuit region 210 are placed in the IC layout, but are arranged at the new gate pattern pitch CPPb. As a result, a device size of the devices in the circuit region 210 is increased and an intermediate circuit region 230 is obtained. The intermediate circuit region 230 includes all features and/or devices of the circuit region 210, and is configured to perform the same functionality of the circuit region 210 in a manufactured IC. In the example configuration in FIG. 2B, the intermediate circuit region 230 includes the gate patterns 212, 213, 214 which are now arranged at the new gate pattern pitch CPPb, and the MD contact structures 215, 216 which are now arranged at the new gate pattern pitch CPPb. In some embodiments, the gate pattern width wg of the gate patterns 212, 213, 214 and/or a corresponding MD width (not numbered) of the MD contact structures 215, 216 in the intermediate circuit region 230 are the same as in the circuit region 210. In other words, the gate patterns 212, 213, 214 and MD contact structures 215, 216 are redistributed in the intermediate circuit region 230 at the new gate pattern pitch CPPb, without a change to their corresponding widths. In some embodiments, the gate pattern width of the gate patterns 212, 213, 214 and/or the width of the MD contact structures 215, 216 is/are scaled in accordance with the scaling factor. In some embodiments, both the width and length of each of active regions, gate patterns, MD contact structures in a circuit region are scaled in accordance with the same scaling factor.

The active region 211 of the circuit region 210 is scaled-up in accordance with the scaling factor, and becomes a scaled-up active region 211b which has a greater width (not numbered) along the X-axis than the active region 211. The scaled-up active region 211b has the same height (not numbered) along the Y-axis as the active region 211. The size, e.g., the width along the X-axis, of the circuit region 210 is also increased. For example, the intermediate circuit region 230 has a width Wb corresponding to the width W of the circuit region 210 and the scaling factor CPPb/CPP. In at least one embodiment, Wb=W×CPPb/CPP. Other calculations of Wb are within the scopes of various embodiments. A width change along the X-axis due to the scaling-up is ΔWb=Wb−W.

In some embodiments, after the re-placement, the APR tool performs a routing modification to adjust at least one existing routing feature in the circuit region 210 and/or to add at least one additional routing feature. As described herein, a routing feature includes a conductive pattern and/or a via. Conductive patterns elongated along the Y-axis are sometimes referred to as vertical routings, and conductive patterns elongated along the X-axis are sometimes referred to as horizontal routing. The conductive patterns 227, 228, 229 are examples of horizontal routing. Further examples of horizontal routing and examples of vertical routing are described with respect to FIGS. 4-6.

In some embodiments, an adjustment of existing routing features after scaling a circuit region along the X-axis comprises rearranging existing vias and vertical routing of the circuit region in accordance with the scaling factor. For example, the positions of the vias 217, 218, 219 along the X-axis in the circuit region 210 are shifted along the scaling direction, i.e., the X+ direction, to be new positions of the vias 217, 218, 219 in the intermediate circuit region 230. A shifted distance of each of the vias 217, 218, 219 is proportional, in accordance with the scaling factor, to a spacing along the X-axis between the via 217, 218, 219 and the fixed edge 223. Between the circuit region 210 and intermediate circuit region 230, the position of the via 217 is shifted the smallest distance in the X+ direction, the position of the via 218 is shifted a distance greater than that of the via 217, the position of the via 219 is shifted a distance greater than that of the via 218. Vertical routing is shifted in a similar manner. In some embodiments, the size of the vias and/or the metal width of vertical routing are unchanged by the scaling of the circuit region. As a result of the scaling and subsequent rearrangement of vias and vertical routing existing in the circuit region 210, the intermediate circuit region 230 is obtained.

In some embodiments, an adjustment of existing routing features after scaling a circuit region along the X-axis further comprises resizing one or more existing horizontal routing of the circuit region. For example, the middle view in FIG. 2B shows the existing horizontal routing of the circuit region 210, i.e., the conductive patterns 227, 228, 229, after the scaling. The conductive patterns 227, 228, 229 are resized in accordance with the scaling factor to obtain corresponding conductive patterns 227b, 228b, 229b in the modified circuit region 232 at the bottom view in FIG. 2B. For example, the length of each of the conductive patterns 227, 228, 229 in the circuit region 210 is re-sized, e.g., increased, by the scaling factor, to obtain the length of the corresponding conductive pattern 227b, 228b, 229b in the modified circuit region 232. Further horizontal routing, e.g., conductive patterns in one or more further even metal layers, are resized in a similar manner. In some embodiments, the metal width of horizontal routing is unchanged by the scaling of the circuit region.

Except for the resized lengths of the conductive pattern 227b, 228b, 229b, the modified circuit region 232 is the same as the intermediate circuit region 230. The modified circuit region 232 is a result of the described scaling-up operation of the circuit region 210. The modified circuit region 232 is configured to perform the same functionality as the circuit region 210. However, the increased device size of devices in the modified circuit region 232 due to the scaling-up operation provides one or more desirable adjustments in the manufacturing yield and/or performance of manufactured ICs corresponding to a modified layout containing the modified circuit region 232.

Figure 2C:
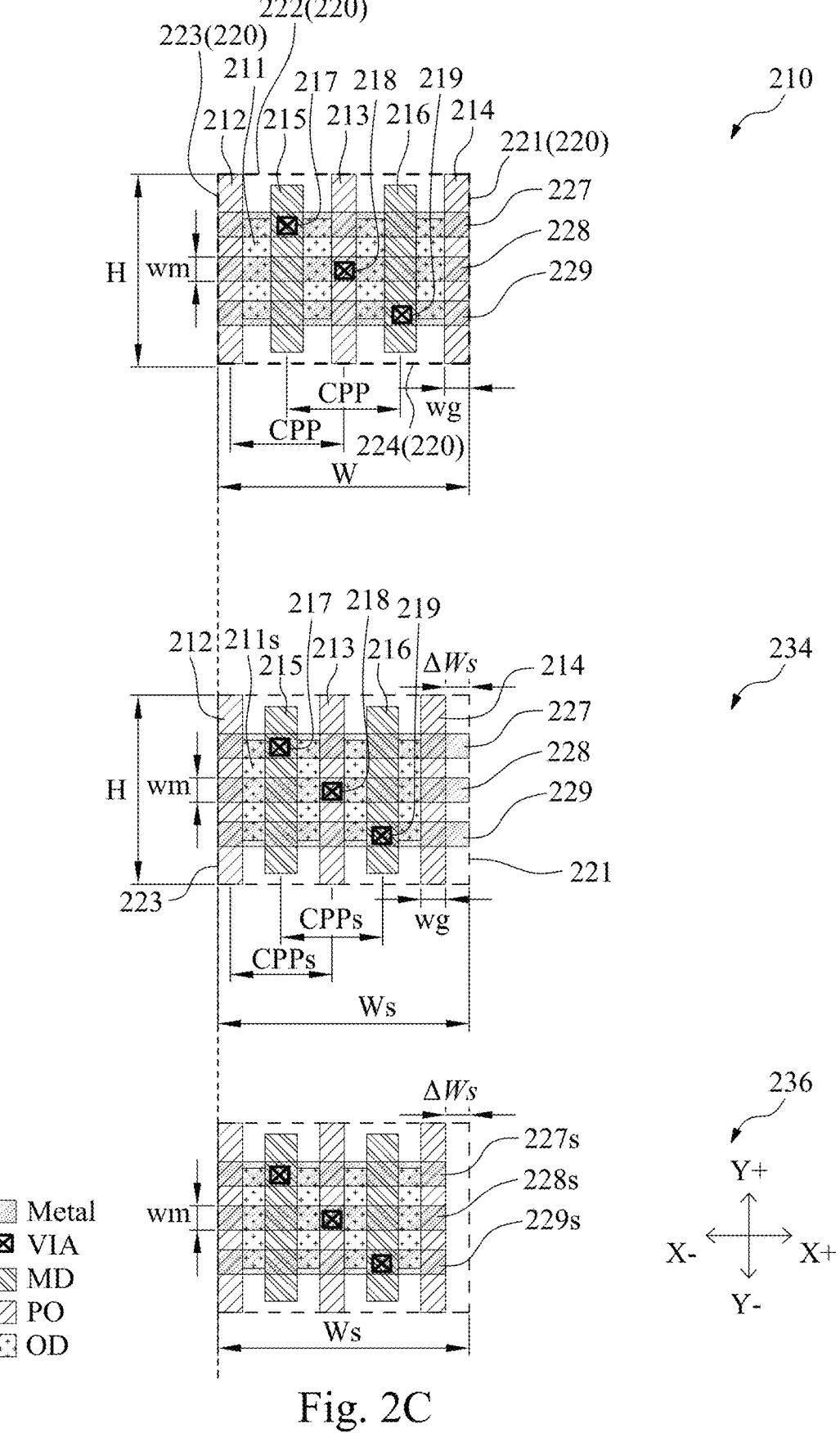

FIG. 2C includes schematic views of the circuit region 210 of an IC layout at several stages in a scaling-down operation along the X-axis, in accordance with some embodiments. In some embodiments, the circuit region 210 in FIG. 2C corresponds to at least one of the circuit regions 203, 204, and/or the IC layout corresponds to the IC layout 200. In FIG. 2C, the top view shows the circuit region 210 before scaling, the middle view shows an intermediate circuit region 234 corresponding to the circuit region 210 after scaling and some routing modification, and the bottom view shows a modified circuit region 236 corresponding to the intermediate circuit region 234 after further routing modification. The top view in FIG. 2C is the same as the top view in FIG. 2B, and a detailed description of the top view in FIG. 2C is omitted.

In some embodiments, a scaling-down (or shrinking) operation of a circuit region along the X-axis comprises decreasing the gate pattern pitch of the circuit region to a smaller gate pattern pitch. For example, as illustrated at the middle view in FIG. 2C, the gate pattern pitch CPP of the circuit region 210 is decreased to a new gate pattern pitch CPPs which is smaller than the gate pattern pitch CPP. A scaling factor of the scaling-down operation is the ratio CPPs/CPP which is smaller than 1. In an example, a circuit region is scaled-down by up to about 10%, resulting in the scaling factor in a range from less than 1 to about 0.9. In the example configuration in FIG. 2C, the scaling direction is the X+ direction, and the edge 223 of the boundary 220 of the circuit region 210 is fixed. However, other manners for scaling-down the circuit region 210 are within the scopes of various embodiments, as described with respect to FIG. 2A.

In some embodiments, information corresponding to at least one of the new gate pattern pitch CPPs or the scaling factor CPPs/CPP is input, automatically from an automated system and/or manually by a user, to an APR tool. Based on the input information, the APR tool obtains the new gate pattern pitch CPPs and performs a re-placement of circuit elements (or devices) of the circuit region 210 at the new gate pattern pitch CPPs along the X-axis. In the re-placement, the devices of the circuit region 210 are placed in the IC layout, but are arranged at the new gate pattern pitch CPPs. As a result, a device size of the devices in the circuit region 210 is decreased and an intermediate circuit region 234 is obtained. The intermediate circuit region 234 includes all features and/or devices of the circuit region 210, and is configured to perform the same functionality of the circuit region 210 in a manufactured IC. In the example configuration in FIG. 2C, the intermediate circuit region 234 includes the gate patterns 212, 213, 214 which are now arranged at the new gate pattern pitch CPPs, and the MD contact structures 215, 216 which are now arranged at the new gate pattern pitch CPPs. In some embodiments, the gate pattern width wg of the gate patterns 212, 213, 214 and/or a corresponding MD width (not numbered) of the MD contact structures 215, 216 in the intermediate circuit region 234 are the same as in the circuit region 210. In other words, the gate patterns 212, 213, 214 and MD contact structures 215, 216 are redistributed in the intermediate circuit region 234 at the new gate pattern pitch CPPs, without a change to their corresponding widths. In some embodiments, the gate pattern width of the gate patterns 212, 213, 214 and/or the width of the MD contact structures 215, 216 is/are scaled in accordance with the scaling factor. In some embodiments, both the width and length of each of active regions, gate patterns, MD contact structures in a circuit region are scaled in accordance with the same scaling factor.

The active region 211 of the circuit region 210 is scaled-down in accordance with the scaling factor, and becomes a scaled-down active region 211s which has a smaller width (not numbered) along the X-axis than the active region 211. The scaled-down active region 211s has the same height (not numbered) along the Y-axis as the active region 211. The size, e.g., the width along the X-axis, of the circuit region 210 is also decreased. For example, the intermediate circuit region 234 has a width Ws corresponding to the width W of the circuit region 210 and the scaling factor CPPs/CPP. In at least one embodiment, $Ws=W\times CPPs/CPP$. Other calculations of Ws are within the scopes of various embodiments. A width change along the X-axis due to the scaling-down is $\Delta Ws=W-Ws$.

In some embodiments, after the re-placement, the APR tool performs a routing modification to adjust at least one existing routing feature in the circuit region 210 and/or to add at least one additional routing feature. In some embodiments, an adjustment of existing routing features after scaling a circuit region along the X-axis comprises rearranging existing vias and vertical routing of the circuit region in accordance with the scaling factor. For example, the positions of the vias 217, 218, 219 along the X-axis in the circuit region 210 are shifted in the X-direction to be new positions of the vias 217, 218, 219 in the intermediate circuit region 234. A shifted distance of each of the vias 217, 218, 219 is proportional, in accordance with the scaling factor, to a spacing along the X-axis between the via 217, 218, 219 and the fixed edge 223. Between the circuit region 210 and intermediate circuit region 234, the position of the via 217 is shifted the smallest distance in the X– direction, the position of the via 218 is shifted a distance greater than that of the via 217, the position of the via 219 is shifted a distance greater than that of the via 218. Vertical routing is shifted in a similar manner. In some embodiments, the size of the vias and/or the metal width of vertical routing are unchanged by the scaling of the circuit region. As a result of the scaling and subsequent rearrangement of vias and vertical routing existing in the circuit region 210, the intermediate circuit region 234 is obtained.

In some embodiments, an adjustment of existing routing features after scaling a circuit region along the X-axis further comprises resizing one or more existing horizontal routing of the circuit region. For example, the middle view in FIG. 2C shows the existing horizontal routing of the circuit region 210, i.e., the conductive patterns 227, 228, 229, after the scaling. The conductive patterns 227, 228, 229 are resized in accordance with the scaling factor to obtain corresponding conductive patterns 227s, 228s, 229s in the modified circuit region 236 at the bottom view in FIG. 2C. For example, the length of each of the conductive patterns 227, 228, 229 in the circuit region 210 is re-sized, e.g., decreased, by the scaling factor, to obtain the length of the corresponding conductive pattern 227s, 228s, 229s in the modified circuit region 236. Further horizontal routing, e.g., conductive patterns in one or more further even metal layers, are resized in a similar manner. In some embodiments, the metal width of horizontal routing is unchanged by the scaling of the circuit region.

Except for the resized lengths of the conductive pattern 227s, 228s, 229s, the modified circuit region 236 is the same as the intermediate circuit region 234. The modified circuit region 236 is a result of the described scaling-down operation of the circuit region 210. The modified circuit region 236 is configured to perform the same functionality as the circuit region 210. However, the decreased device size of devices in the modified circuit region 236 due to the scaling-down operation provides one or more desirable adjustments in the manufacturing yield and/or performance of manufactured ICs corresponding to a modified layout containing the modified circuit region 236.

The scaling operations described with respect to FIGS. 2B-2C are example scaling operations along the X-axis. In some embodiments, scaling operations along the Y-axis, or scaling operations along both the X-axis and Y-axis, are performed in similar manners. In at least one embodiment, a circuit region is scaled up or down at the same scaling factor along both the X-axis and the Y-axis.

Figure 2D:
FIG. 2D is a schematic cross-sectional view of an IC, in accordance with some embodiments.
Figure 2D:
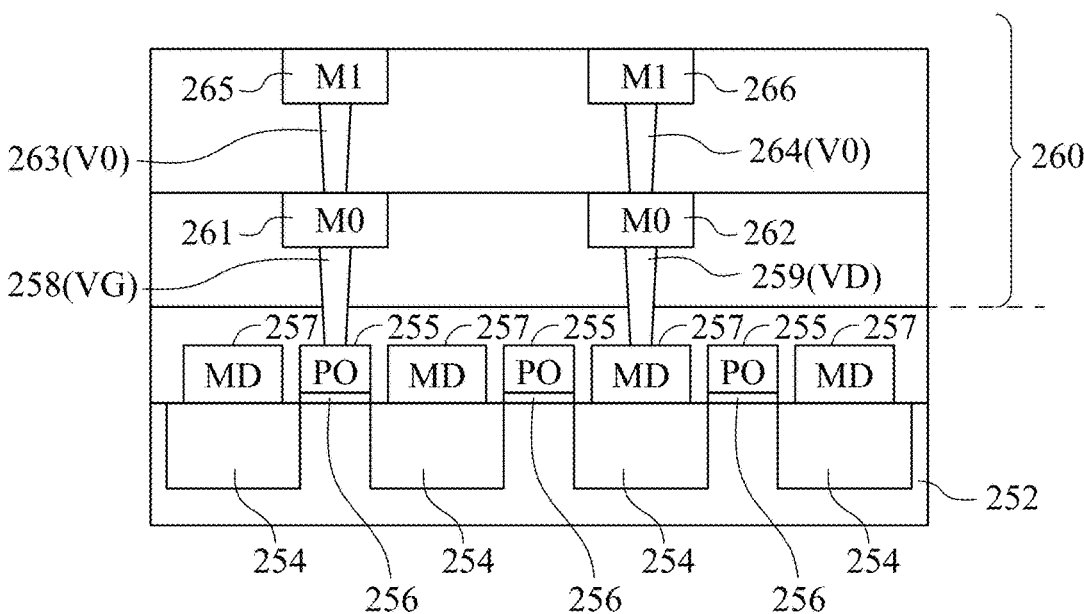

FIG. 2D is a schematic cross-sectional view of an IC 250, in accordance with some embodiments. In at least one embodiment, the IC 250 corresponds to one or more IC layouts described with respect to one or more of FIGS. 2A-2C and 3A-7.

As shown in FIG. 2D, the IC device 250 comprises a substrate 252 over which circuit elements and structures corresponding to one or more circuit regions and/or layouts described herein are formed. The substrate 252 has a thickness direction along a Z-axis perpendicular to both the X-axis and Y-axis. The Z-axis has a Z+ direction and an opposite Z– direction, as illustrated in FIG. 2D. The substrate 252 comprises, in at least one embodiment, silicon, silicon germanium (SiGe), gallium arsenic, or other suitable semiconductor or dielectric materials. In some embodiments, the substrate 252 is a P-doped substrate. In some embodiments, the substrate 252 is an N-doped substrate. In some embodiments, the substrate 252 is a rigid crystalline material other than a semiconductor material (e.g., diamond, sapphire, aluminum oxide ($Al_2O_3$), or the like) on which an IC is manufactured.

The IC device 250 further comprises N-type and P-type dopants added to the substrate 252 to correspondingly form n-channel metal-oxide semiconductor (NMOS) active regions and p-channel metal-oxide semiconductor (PMOS) active regions. The NMOS active regions and PMOS active regions form active regions. In some embodiments, isolation structures are formed between adjacent active regions. For simplicity, isolation structures are omitted from FIG. 2D. In at least one embodiment, the active regions of the IC 250 correspond to one or more of the active regions described with respect to FIGS. 2B-2C.

The IC device 250 further comprises various gate structures over the active regions. For example, a gate structure comprises a gate portion 255, and a corresponding gate dielectric 256 over an active region of the substrate 252. Example materials of the gate dielectric 256, which includes one or more layers, include HfO2, ZrO2, or the like. Example materials of the gate portion 255 include polysilicon, metal, or the like. In some embodiments, various gate structures of the IC 250 correspond to one or more of the gate patterns 212, 213, 214, as described with respect to FIGS. 2B-2C. In at least one embodiment, gate structures corresponding to dummy gate patterns include dielectric materials.

The IC device 250 further comprises MD contact structures for electrically coupling underlying source/drains of various transistors in the active regions to other circuit elements. For example, MD contact structures 257 are illustrated in FIG. 2D. In some embodiments, at least one of the MD contact structures 257 corresponds to one or more of the MD contact structures 215, 216, as described with respect to FIGS. 2B-2C.

The IC device 250 further comprises VD vias and VG vias correspondingly over and in electrical contact with MD contact structures and gate structures. For example, as shown in FIG. 2D, a VG via 258 is over and in electrical contact with the gate portion 255 of one of the gate structures, and a VD via 259 is over and in electrical contact with one of the MD contact structures 257. In some embodiments, the VG via 258 corresponds to the VG via 218, and/or the VD via 259 corresponds to one or more of the VD vias 217, 219, as described with respect to FIGS. 2B-2C.

The IC device 250 further comprises an interconnect structure 260 which is over the VD and VG vias, and comprises a plurality of metal layers M0, M1, . . . and a plurality of via layers V0, V1, . . . arranged alternatingly in the thickness direction of the substrate 252, i.e., along the Z-axis. The interconnect structure 260 further comprises various interlayer dielectric (ILD) layers (not shown or numbered) in which the metal layers and via layers are embedded. The metal layers and via layers of the interconnect structure 260 are configured to electrically couple various elements or circuits of the IC device 250 with each other, and/or with external circuitry. For simplicity, metal layers and via layers above the M1 layer are omitted in FIG. 2D.

The M0 layer comprises M0 conductive patterns 261, 262 correspondingly over and in electrical contact with the VG via 258 and VD via 259. In some embodiments, at least one of the M0 conductive patterns 261, 262 corresponds to one or more of the conductive patterns 227, 228, 229, as described with respect to FIGS. 2B-2C. The V0 layer comprises V0 vias 263, 264 correspondingly over and in electrical contact with the M0 conductive patterns 261, 262. The M1 layer comprises M1 conductive patterns 265, 266 correspondingly over and in electrical contact with the V0 vias 263, 264. The M0 conductive patterns, V0 vias, M1 conductive patterns, and/or further conductive patterns and vias of the interconnect structure 260 provide electrical connections to various circuit elements of the IC 250 and/or to external circuitry.

In some embodiments, as a result of various scaling operations performed for corresponding different circuit regions in an IC layout, an IC manufactured in accordance with the IC layout comprises corresponding different circuit regions with different gate pattern pitches. For example, when the circuit regions 201, 202 of the IC layout 200 are scaled up at different scaling factors, an IC corresponding to the modified IC layout 200 includes corresponding circuit regions with different gate pattern pitches which are greater than the gate pattern pitch in other unscaled circuit regions. For a further example, when the circuit regions 203, 204 of the IC layout 200 are scaled down at different scaling factors, an IC corresponding to the modified IC layout 200 includes corresponding circuit regions with different gate pattern pitches which are smaller than the gate pattern pitch in other unscaled circuit regions. For yet another examples, when circuit regions 201, 202 of the IC layout 200 are scaled up at different scaling factors and circuit regions 203, 204 of the IC layout 200 are scaled down at different scaling factors, an IC corresponding to the modified IC layout 200 includes corresponding circuit regions with four different gate pattern pitches other than the gate pattern pitch in other unscaled circuit regions. Other configurations are within the scopes of various embodiments.

Figure 3A:
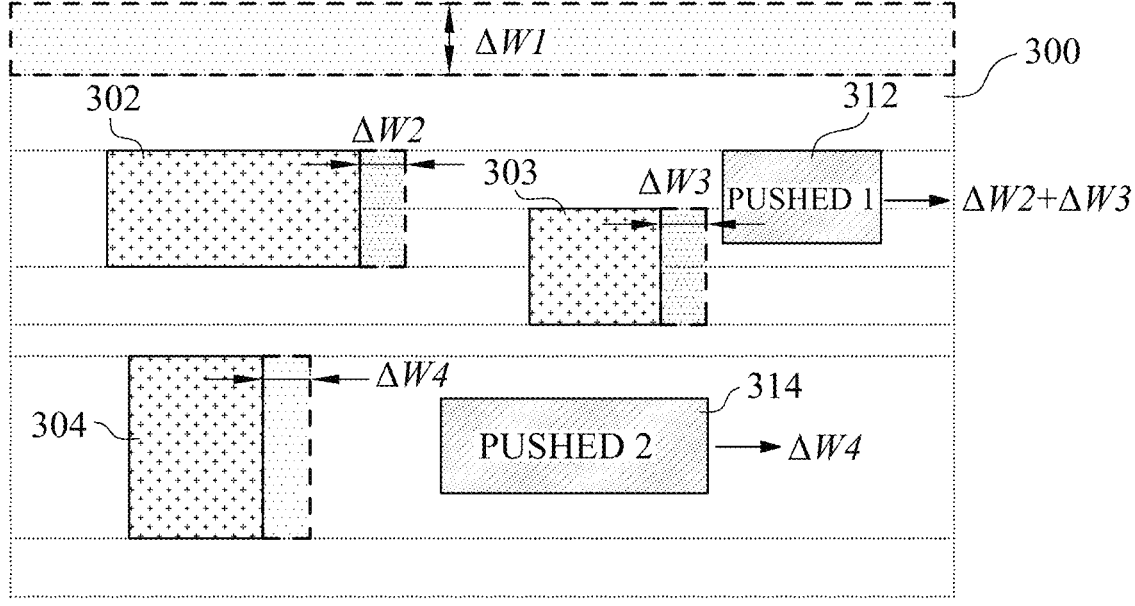

FIG. 3A is a schematic view of an IC layout 300 in various scaling operations with pushed areas, in accordance with some embodiments.

The IC layout 300 comprises circuit regions 302, 303, 304 to be scaled up, and areas 312, 314. In some embodiments, one or more of the circuit regions 302, 303, 304 to be scaled up correspond to one or more of the circuit regions 201, 202. In at least one embodiment, at least one of the areas 312, 314 comprises one or more circuit regions to be scaled-up, and/or one or more circuit regions to be scaled-down, and/or one or more unscaled circuit regions.

In the example configuration in FIG. 3A, the circuit regions 302, 303, 304 are to be scaled-up in the X+ direction. The area 312 is arranged in the X+ direction with respect to the circuit regions 302, 303, and at least partially overlaps each of the circuit regions 302, 303 along the X-axis. The area 314 is arranged in the X+ direction with respect to the circuit region 304, and at least partially overlaps the circuit region 304 along the X-axis. The circuit region 303 is arranged in the X+ direction with respect to the circuit region 302, and at least partially overlaps the circuit region 302 along the X-axis. ΔW1 in FIG. 3A indicates a height increase along the Y-axis due to a scaling operation along the Y-axis at one or more circuit regions.

Based on scaling factors at which the circuit regions 302, 303, 304 are to be scaled-up in the X+ direction, corresponding width increases ΔW2, ΔW3, ΔW4 of the circuit regions 302, 303, 304 after scaling-up are determinable by the APR tool, for example, based on the widths of the circuit regions 302, 303, 304 before scaling-up and the corresponding scaling factors, as described with respect to FIG. 2B. In some situations, there is a risk or concern that the width increases of one or more of the circuit regions 302, 303, 304 after scaling-up potentially cause gate patterns of the scaled-up circuit regions to overlap gate patterns of one or more other circuit regions located adjacent to the scaled-up circuit regions in the scaling direction. Gate pattern overlapping violates one or more design rules and is to be avoided.

In one or more embodiments, potential gate pattern overlapping is avoidable by causing the APR tool, after scaling-up a circuit region, to push, or move, one or more circuit regions further in the scaling direction. For example, to avoid potential gate pattern overlapping due to the width increase ΔW2 after scaling-up the circuit region 302 in the X+ direction, the APR tool pushes, or moves, the circuit region 303 adjacent to and overlapping the circuit region 302 in the X+ direction by a distance corresponding to the width increase ΔW2. The circuit region 303 itself has the width increase ΔW3 after scaling-up, result in a combined width increase ΔW2+ΔW3 caused by scaling-up the circuit regions 302, 304. To avoid potential gate pattern overlapping due to the combined width increase ΔW2+ΔW3 after scaling-up the circuit regions 302, 303 in the X+ direction, the APR tool pushes, or moves, the area 312 (referred to herein as "pushed area" and designated as PUSHED 1 in FIG. 3A) adjacent to and overlapping the circuit region 303 in the X+ direction by a distance corresponding to the combined width increase ΔW2+ΔW3.

In some embodiments, the area 312 is pushed by the combined width increase ΔW2+ΔW3 even when the area 312 does not overlap the circuit region 302 along the X+ direction. It is sufficient that the area 312 overlaps, at least partially, the circuit region 303 along the X+ direction, whereas the circuit region 303 overlaps, at least partially, the circuit region 302 along the X+ direction. In some embodiments, when the area 312 at least partially overlaps the circuit region 302 but does not overlap the circuit region 303 along the X+ direction, the area 312 is pushed by a distance corresponding to the width increase ΔW2 after scaling-up the circuit region 302.

In some embodiments, to avoid potential gate pattern overlapping due to the width increase ΔW4 after scaling-up the circuit region 304 in the X+ direction, the APR tool pushes, or moves, the area 314 (also referred to herein as "pushed area" and designated as PUSHED 2 in FIG. 3A) adjacent to and overlapping the circuit region 304 in the X+ direction by a distance corresponding to the width increase ΔW4.

In some embodiments, the described pushing operation is applicable to scaling-up operations and to circuit regions or areas located in the scaling direction with respect to the circuit region(s) being scaled-up. For example, when the circuit region 304 is scaled-down, the area 314 is not to be pushed. For another example, circuit regions and/or areas located in the X– direction with respect to the circuit region 302 (i.e., on the left side of the circuit region 302 in FIG. 3A) are not to be pushed even if the circuit regions and/or areas overlap the circuit region 302 along the X-axis.

In some embodiments, the decision to push or move an area to avoid potential gate pattern overlapping is automatically performed and/or based on user input. For example, in one or more embodiments, the APR tool is configured to, based on positions and/or heights of various circuit regions and/or areas 302, 303, 312 along the Y-axis, make a first determination whether an area 312 overlaps a circuit region(s) 302, 303 to be scaled-up along the X-axis. The APR tool is further configured to, based on positions and/or widths of various circuit regions and/or areas 302, 303, 312 along the X-axis, make a second determination whether the area 312 overlapping the circuit region(s) 302, 303 to be scaled-up along the X-axis is also located in the scaling direction, e.g., X+ direction with respect to the circuit region(s) 302, 303 to be scaled-up. Upon reaching a conclusion that both first and second determinations are affirmative, the APR tool sets a property or attribute of the area 312 to PUSH, i.e., to be a pushed area, and uses the calculated width increase(s) ΔW2, ΔW3 of the circuit region(s) 302, 303 to push or move the area 312 in the scaling direction, e.g., the X+ direction, after scaling-up the circuit region(s) 302, 303. In some embodiments, an area is set as a pushed area by a marker layer that overlaps the pushed area. A marker layer is a virtual layer for processing layouts, and is not manufactured on a lithography mask and/or wafers.

In at least one embodiment, the APR tool sets at least one of the area 312 or the area 314 as a pushed area, based on user input. For example, in one or more embodiments, circuit regions to be scaled in an IC layout are highlighted to be visually distinctive from other, unscaled circuit regions as described herein with respect to FIG. 2A. In the example configuration in FIG. 3A, the circuit regions 302, 303, 304 to be scaled-up are visually presented, e.g., by a display device of an APR tool, to be visually distinctive from other circuit regions or areas. As a result, it is possible for a user to quickly realize, in one or more embodiments, that the area 312 overlaps the circuit regions 302, 303 to be scaled-up and is located in the scaling direction, i.e., the X+ direction, i.e., the area 312 is to be set as a pushed area. In at least one embodiment, the user provides user input indicating that the area 312 is to be set as a pushed area. In response to the user input, the APR tool sets a property or attribute of the area 312 to PUSH, and uses the calculated width increase(s) ΔW2, ΔW3 of the circuit region(s) 302, 303 to push or move the area 312 in the scaling direction, e.g., the X+ direction, after scaling-up the circuit region(s) 302, 303.

In some embodiments, the APR tool and/or an external computer system is/are configured to perform machine learning from teaching data including past user inputs in various situations when pushed areas were set or were not set. In some embodiments, a result of the machine learning includes a machine learned model and/or a trained neural network. The APR tool and/or an external computer system is/are configured to apply the machine learned model and/or the trained neural network to determine, in future situations, where one or more pushed areas are to be set, in addition to or in lieu of user input. Other arrangements for setting one or more pushed areas are within the scopes of various embodiments.

Figure 3B:
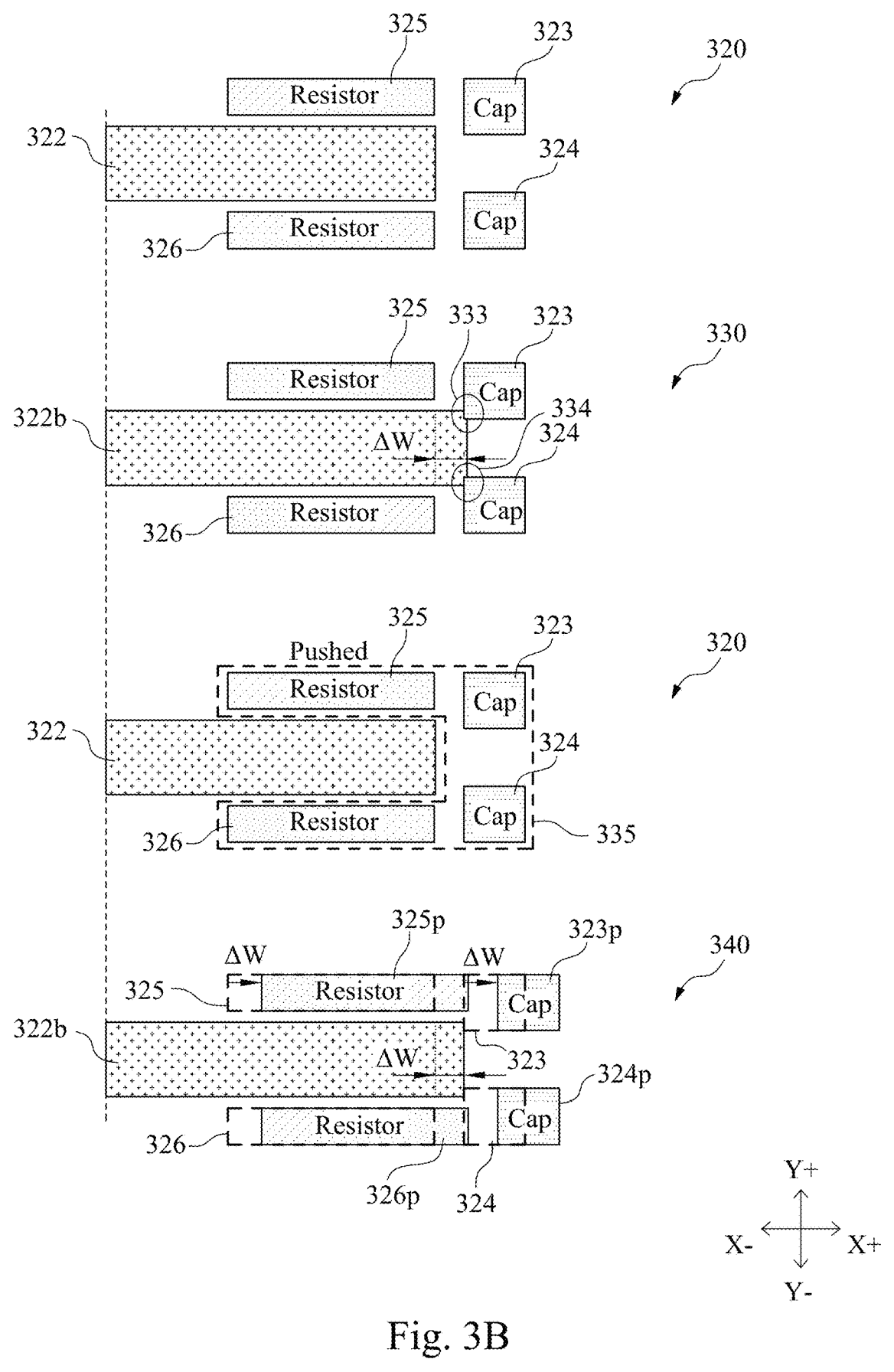

FIG. 3B includes schematic views of a portion of an IC layout 320 in various scaling operations with pushed areas, in accordance with some embodiments. In FIG. 3B, from the top down, the first view shows the IC layout 320 without a pushed area being set, the second view shows the IC layout 320 without a pushed area being set when a circuit region is scaled-up, the third view shows the IC layout 320 with a pushed area being set, and the fourth view shows the IC layout 320 with a pushed area being set when a circuit region is scaled-up.

As illustrated at the first view in FIG. 3B, the IC layout 320 comprises a circuit region 322 to be scaled-up in the X+ direction, capacitor regions (designated as Cap in FIG. 3B) 323, 324, and resistor regions (designated as Resister) 325, 326. The number and/or arrangement of the capacitor regions 323, 324 and/or the resistor regions 325, 326 are examples. Other arrangements are within the scopes of various embodiments. The capacitor regions 323, 324 and the resistor regions 325, 326 are examples of analog circuit regions that are not to be scaled in order to maintain original sizes and to maintain unchanged performance. Further examples of circuit regions that are not to be scaled include high-speed digital circuits. The first view in FIG. 3B shows a situation when no pushed area is set in association with the circuit region 322 to be scaled-up.

As illustrated at the second view in FIG. 3B, when the circuit region 322 is scaled-up, a scaled-up circuit region 322b is obtained. In some embodiments, the circuit region 322 is scaled-up in accordance with a new gate pattern pitch and routing modifications are made, as described with respect to FIG. 2B. A size of the scaled-up circuit region 322b along the X-axis corresponds to a size of the circuit region 322 along the X-axis increased by ΔW. The increased size of the scaled-up circuit region 322b causes the scaled-up circuit region 322b to touch the capacitor regions 323, 324, or otherwise violate one or more design rules, as schematically illustrated at areas 333, 334. These issues are either recognized by a user, or found by one or more checks when a modified layout 330 including the scaled-up circuit region 322b are subjected to verifications, as described with respect to FIG. 1. For example, the scaled-up circuit region 322b touching one or more of the capacitor regions 323, 324 will cause an LVS check to fail. For another example, the scaled-up circuit region 322b that does not touch, but comes too close to one or more of the capacitor regions 323, 324 such as a distance between the scaled-up circuit region 322b and the capacitor regions 323, 324 is less than a critical dimension defined in a design rule, will cause a DRC to fail. Upon determining that the modified layout 330 fails one or more verifications, the process is returned to the initial IC layout 320 for correction and/or adjustment, automatically by an APR tool and/or based on user input.

As illustrated at the third view in FIG. 3B, a pushed area 335 is set in the IC layout 320 to include the capacitor regions 323, 324 and the resistor regions 325, 326. In the example configuration in FIG. 3B, although the resistor regions 325, 326 are not likely to touch or come too close to the scaled-up circuit region 322b, the resistor regions 325, 326 are still included in the pushed area 335. A reason is that there are vertical routings (not shown) connecting the resistor regions 325, 326 to the circuit region 322 to be scaled-up, and therefore, the resistor regions 325, 326 are included in the pushed area 335 to be moved along with the scaled-up circuit region. In some embodiments, the resistor regions 325, 326 are not included in the pushed area 335 and remain at the same place when the circuit region 322 is scaled-up. In at least one embodiment, the decision to include the resistor regions 325, 326 in the pushed area 335 or not is made by a user based on his/her expertise. In at least one embodiment, the decision to include the resistor regions 325, 326 in the pushed area 335 is made automatically by the APR tool and/or another computer system, for example, by machine learning as described herein. Other arrangements are within the scopes of various embodiments.

As illustrated at the fourth view in FIG. 3B, as a result of the capacitor regions 323, 324 and the resistor regions 325, 326 being included in the set pushed area 335, when the circuit region 322 is scaled-up and increased in size by ΔW, the capacitor regions 323, 324 and resistor regions 325, 326 are all pushed in the scaling direction, i.e., the X+ direction, by a distance corresponding to ΔW. The pushed circuit regions are designated as 323p, 324p, and the pushed resistor regions 325, 326 are designated as 325p, 326p. The physical and/or electrical relationship between the pushed capacitor regions 323p, 324p and the pushed resistor regions 325p, 326p remains the same as that in the IC layout 320 before scaling-up the circuit region 322 to the scaled-up circuit region 322b. The scaled-up circuit region 322b no longer touches or comes too close to the pushed capacitor regions 323p, 324p. As a result, a modified layout 340 with the scaled-up circuit region 322b and satisfying various verifications is obtained.

Figure 4:
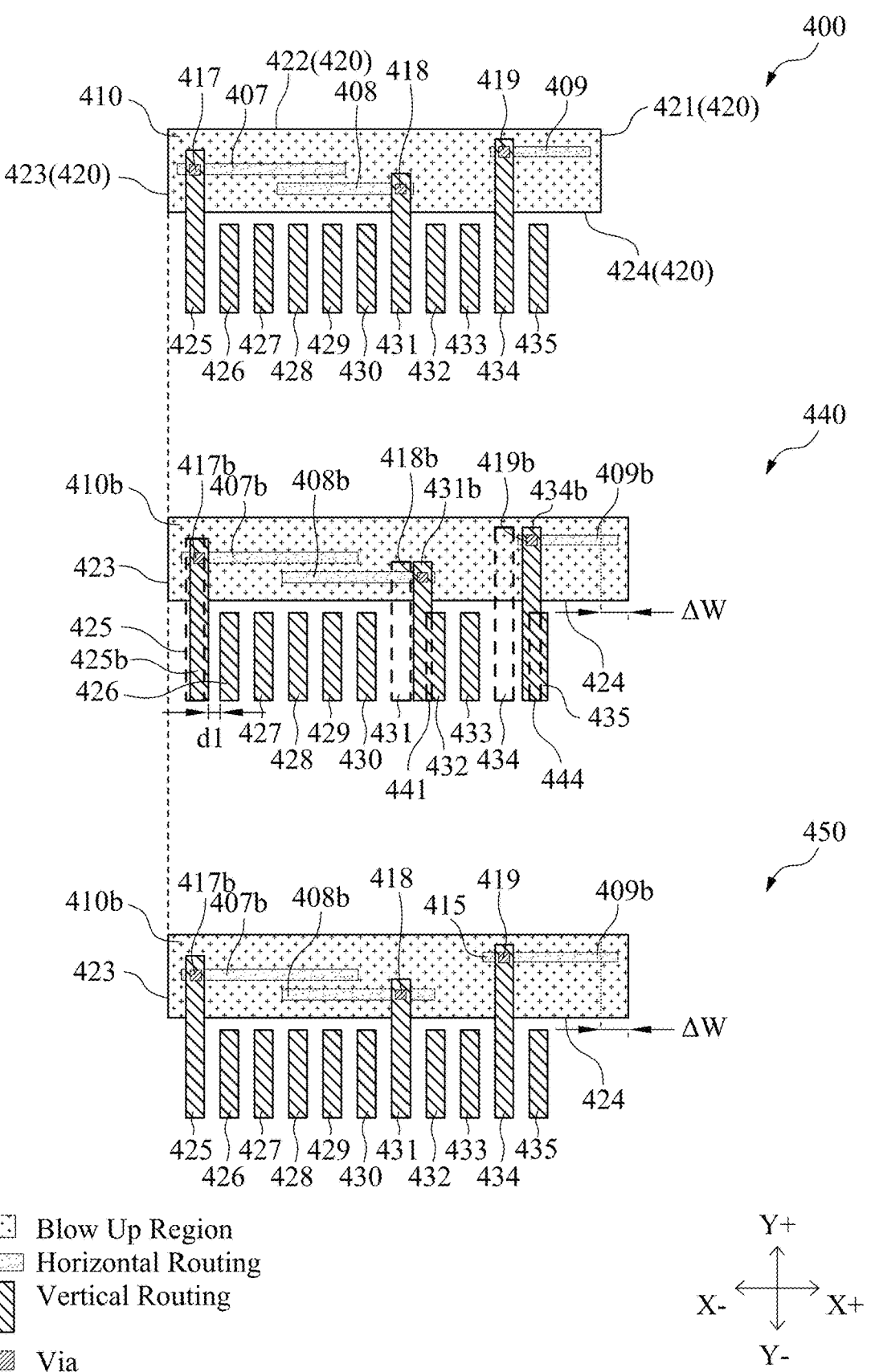
FIG. 4 includes schematic views of an IC layout in a scaling operation, in accordance with some embodiments.

FIG. 4 includes schematic views of an IC layout 400 in a scaling operation, in accordance with some embodiments. In FIG. 4, the top view shows the IC layout 400 before scaling a circuit region 410 contained in the IC layout 400, the middle view shows an intermediate layout 440 with the circuit region 410 after scaling and some routing modification, and the bottom view shows a modified layout 450 after further routing modification.

As illustrated in the top view of FIG. 4, the IC layout 400 comprises the circuit region 410 which has a boundary 420 with edges 421, 422, 423, 424. In some embodiments, the circuit region 410 corresponds to the circuit region 210, and/or the boundary 420 with edges 421, 422, 423, 424 corresponds to the boundary 220 with edges 221, 222, 223, 224 described with respect to FIG. 2B. The circuit region 410 comprises one or more active regions, one or more gate patterns, and one or more MD contact structures corresponding to the active regions, gate patterns, MD contact structures described with respect to FIG. 2B. For simplicity the active regions, gate patterns, and MD contact structures of the circuit region 410 are omitted in FIG. 4. The circuit region 410 further comprises horizontal routing, vertical routing and vias between corresponding horizontal routing and vertical routing. In the example configuration in FIG. 4, example horizontal routing of the circuit region 410 includes conductive patterns 407, 408, 409 elongated along the X-axis, example vias include vias 417, 418, 419 correspondingly over and in electrical contact with the conductive patterns 407, 408, 409, and example vertical routing includes conductive patterns 425, 431, 434 elongated along the Y-axis, correspondingly over and in electrical contact with the vias 417, 418, 419. In some embodiments, the circuit region 410 includes further vertical routing and/or horizontal routing in one or more metal layers other than the metal layers of the conductive patterns 407, 408, 409, and 425, 431, 434. The conductive patterns 425, 431, 434 extend from within the circuit region 410 to an outside of the circuit region 410 for electrically coupling the circuitry of the circuit region 410 with other circuit regions. In the example configuration in FIG. 4, the conductive patterns 425, 431, 434 extend across the edge 424 of the boundary 420 of the circuit region 410. In some embodiments, one or more further vertical routing extends across the opposite edge 422 of the boundary 420. The IC layout 400 further comprises conductive patterns 426-430, 432-433 and 435 in the same metal layer as the conductive patterns 425, 431, 434, but are outside the circuit region 410 and do not form vertical routing for the circuit region 410. The conductive patterns 425-435 are arranged along the X-axis at a metal pitch of the corresponding metal layer.

As illustrated in the middle view of FIG. 4, the circuit region 410 is scaled-up along the X+ direction, resulting in a scaled-up circuit region 410b. In some embodiments, the circuit region 410 is scaled-up in accordance with a new gate pattern pitch and routing modifications are made, as described with respect to FIG. 2B. A size of the scaled-up circuit region 410b along the X-axis corresponds to a size of the circuit region 410 along the X-axis increased by ΔW. When the circuit region 410 is scaled-up, corresponding horizontal routing is stretched along the X-axis, while vias and vertical routing are rearranged, e.g., spread out, along the X-axis and in accordance with the scaling factor, as described with respect to FIG. 2B. For example, the conductive patterns 407, 408, 409 are stretched along the X-axis in accordance with the scaling factor, and become corresponding conductive patterns 407b, 408b, 409b in the scaled-up circuit region 410b. The vias 417, 418, 419 and the corresponding conductive patterns 425, 431, 434 are rearranged, e.g., spread out, along the X-axis and in accordance with the scaling factor, to be at new positions as vias 417b, 418b, 419b and conductive patterns 425b, 431b, 434b. In the middle view of FIG. 4, initial positions of the conductive patterns 425, 431, 434 are illustrated in dot-dot lines. As a result of the scaling-up and routing modification, an intermediate layout 440 is obtained as illustrated at the middle view in FIG. 4.

The conductive patterns 426-430, 432-433 and 435 are not associated with the circuit region 410, and are not rearranged due to the scaling-up of the circuit region 410. As a result, there are possibilities that the rearranged conductive patterns 425b, 431b, 434b and the conductive patterns 426-430, 432-433 and 435 that remain at the same positions violate one or more design rules. For example, it is possible that a metal-to-metal distance d1 between the rearranged conductive pattern 425b and the adjacent conductive pattern 426 is smaller than a predetermined value (critical dimension) permitted by a design rule. In at least one embodiment, this issue is verified or found by a DRC check. For another example, the rearranged conductive patterns 431b, 434b correspondingly touch the conductive pattern 432, 435 as schematically illustrated at corresponding overlapping areas 441, 444. In at least one embodiment, these issues correspond to short circuits and are verified or found by an LVS check. Upon determining that the modified layout 440 fails one or more verifications, the process is returned to the APR tool for correction and/or adjustment, automatically and/or based on user input.

As illustrated at the bottom view in FIG. 4, in one or more embodiments, the rearranged conductive patterns 425b, 431b, 434b and the corresponding rearranged vias 417b, 418b, 419b are moved back to the initial positions of the corresponding conductive patterns 425, 431, 434 and the corresponding vias 417, 418, 419. Further, an additional routing feature, e.g., a conductive pattern 415, is added to the conductive pattern 409b, or the conductive pattern 409b is extended in the X-direction to pass under the via 419 for electrical connection with the conductive pattern 434. As a result, the short circuit and/or metal-to-metal distance issues are resolved, and a modified layout 450 with the scaled-up circuit region 410b and satisfying various verifications is obtained. In some embodiments, the conductive patterns 425b, 431b, 434b and vias 417b, 418b, 419b are manually moved back and/or the additional conductive pattern 415 is added by a user, or by an APR tool based on user input. In some embodiments, the conductive patterns 425*b*, 431*b*, 434*b* and vias 417*b*, 418*b*, 419*b* are moved back and/or the additional conductive pattern 415 is added automatically by the APR tool and/or another computer system, for example, by machine learning as described herein. Other arrangements are within the scopes of various embodiments.

Figure 5:
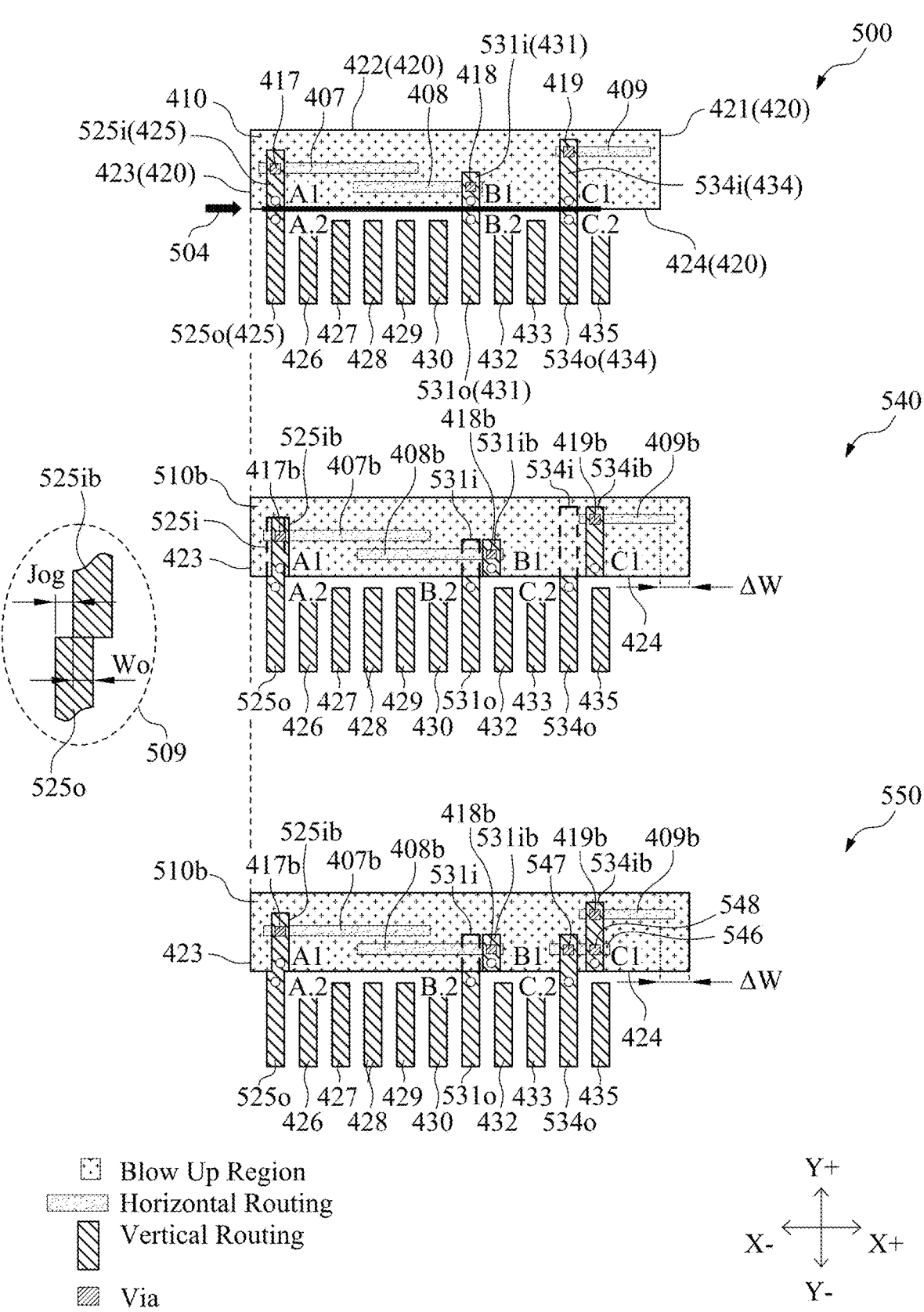
FIG. 5 includes schematic views of an IC layout in disconnecting, scaling and reconnecting operations, in accordance with some embodiments.

FIG. 5 includes schematic views of an IC layout 500 in disconnecting, scaling and reconnecting operations, in accordance with some embodiments. In some embodiments, the IC layout 500 corresponds to the IC layout 400. Elements in FIG. 5 having corresponding elements in FIG. 4 are designated by the same reference numerals. In FIG. 5, the top view shows the IC layout 500 in a disconnecting operation before scaling the circuit region 410 contained in the IC layout 500, the middle view shows an intermediate layout 540 with the circuit region 410 after scaling and some routing modification, and the bottom view shows a modified layout 550 after a reconnecting operation.

As illustrated in the top view of FIG. 5, the IC layout 500 comprises the circuit region 410, as described with respect to FIG. 4. A difference between the top views in FIG. 4 and in FIG. 5 is that, in FIG. 5, a disconnecting operation is performed, e.g., by an APR tool, to disconnect each conductive pattern extending across the boundary 420 of the circuit region 410 into an inner part in the circuit region 410 and an outer part outside the circuit region 410. For example, the conductive patterns 425, 431, 434 extend across the edge 424 of the boundary 420 from outside into the circuit region 410, and are disconnected along the edge 424 as schematically shown by arrow 504. Each of the conductive patterns 425, 431, 434 is divided into an inner part in the circuit region 410 and an outer part outside the circuit region 410. For example, the conductive pattern 425 is divided by the disconnecting operation into an outer part 525*o* and an inner part 525*i*, the conductive pattern 431 is divided into an outer part 5310 and an inner part 531*i*, and the conductive pattern 434 is divided into an outer part 534*o* and an inner part 534*i*.

In some embodiments, the disconnecting operation is automatically performed by an APR tool. For example, the APR tool determines, from the IC layout 500, the boundary 420 of the circuit region 410 and conductive patterns 425, 431, 434 that cross an edge of the boundary 420. The APR tool automatically disconnects the conductive patterns 425, 431, 434 along the edge they cross, e.g., the edge 424. For later reconnecting the disconnected inner and outer parts of the conductive patterns, the APR tool assigns a pair of pins or anchors to adjacent ends of a corresponding pair of inner and outer parts, in a vicinity of the edge 424. For example, a pair of anchors A1, A2 is assigned to the adjacent ends of the corresponding pair of inner part 525*i* and outer part 525*o*, a pair of anchors B1, B2 is assigned to the adjacent ends of the corresponding pair of inner part 531*i* and outer part 531*o*, and a pair of anchors C1, C2 is assigned to the adjacent ends of the corresponding pair of inner part 534*i* and outer part 534*o*. In some embodiments, the assigned anchors A1, B1, C1 have the same coordinates along the X-axis (hereinafter, X-axis coordinates) as the corresponding anchors A2, B2, C2. In at least one embodiment, the X-axis coordinates are determined relative to a reference point or the origin of a coordinate system of the IC layout, as described with respect to FIG. 2A.

As illustrated in the middle view of FIG. 5, the circuit region 410 is scaled-up along the X+ direction, resulting in a scaled-up circuit region 510*b*. In some embodiments, the circuit region 410 is scaled-up in accordance with a new gate pattern pitch and routing modifications are made, as described with respect to FIG. 2B. A size of the scaled-up circuit region 510*b* along the X-axis corresponds to a size of the circuit region 410 along the X-axis increased by ΔW. When the circuit region 410 is scaled-up, corresponding horizontal routing is stretched along the X-axis, while vias and vertical routing are rearranged, e.g., spread out, along the X-axis and in accordance with the scaling factor, as described with respect to FIG. 2B.

In embodiments of FIG. 4, the conductive patterns 425, 431, 434 are not disconnected and are rearranged as whole when the circuit region 410 is scaled-up. In contrast, in embodiments of FIG. 5, the conductive patterns 425, 431, 434 are disconnected along the edge 424 and, therefore, the inner parts 525*i*, 531*i*, 534*i* are rearranged when the circuit region 410 is scaled-up but the outer parts 525*o*, 531*o*, 534*o* remain unchanged. Therefore, potential design rule violation issues discussed with respect to embodiments of FIG. 4 are avoidable in embodiments of FIG. 5. In the middle view of FIG. 5, initial positions of the inner parts 525*i*, 531*i*, 534*i* are illustrated in dot-dot lines. The inner parts 525*i*, 531*i*, 534*i* are rearranged, e.g., spread out, in accordance with the scaling factor in a manner similar to that described with respect to FIG. 4, and assume new positions as corresponding rearranged inner parts 525*ib*, 531*ib*, 534*ib*. As a result of the disconnecting, scaling-up and routing modification, an intermediate layout 540 is obtained as illustrated at the middle view in FIG. 5.

In some embodiments, the APR tool determines whether it is necessary to reconnect the corresponding inner part and outer part which were disconnected from an initial conductive pattern by a disconnecting operation described herein. In at least one embodiment, the APR tool makes the determination based on coordinates of the paired anchors along the X-axis. In an example, based on the X-axis coordinates of anchors A1, A2 correspondingly on the rearranged inner part 525*ib* and outer part 525*o*, it is possible to determine the X-axis distance between anchors A1, A2. If the X-axis distance between anchors A1, A2 is greater than a predetermined value related to the metal width of the rearranged inner part 525*ib* and outer part 525*o*, the APR tool determines that the rearranged inner part 525*ib* and outer part 525*o* are not properly electrically connected, and one or more additional routing features are to be added to connect the rearranged inner part 525*ib* and outer part 525*o*. Similar determinations are made for the other pairs of anchors B1, B2 and C1, C2.

In some embodiments, a pair of corresponding rearranged inner part and outer part is determined as not properly electrically connected even when the parts touch each other. For example, in the intermediate layout 540, the electrical connection between the outer part 525*o* and rearranged inner part 525*ib* exists, but its acceptability is to be verified. The enlarged view 509 in the middle view of FIG. 5 shows the adjacent ends of the rearranged inner part 525*ib* and outer part 525*o*. The rearranged inner part 525*ib* and outer part 525*o* overlap over an overlapping width Wo. In at least one embodiment, the overlapping width Wo is determinable based on the X-axis distance between anchors A1, A2 (not shown in view 509) and the metal width of the rearranged inner part 525*ib* and outer part 525*o*. If the overlapping width Wo is greater than a predetermined minimal metal width defined by a design rule, the connection between the rearranged inner part 525*ib* and outer part 525*o* is acceptable in a DRC verification. In this situation, the APR tool makes no attempt to reconnect the rearranged inner part 525*ib* and outer part 525*o*. Otherwise, at least one additional routing feature is added to satisfy the design rule. For example, when the overlapping width Wo fails a DRC verification, a routing modification is made by the APR tool to extend one of the rearranged inner part 525*ib* and outer part 525*o* toward and over the other. As a result, the overlapping width Wo becomes greater than a metal width of the rearranged inner part 525*ib* or outer part 525*o*, and the design rule is satisfied. Alternatively or additionally, a Jog value corresponding to the amount of overhang one of the rearranged inner part 525*ib* and outer part 525*o* protrudes along the X-axis from the other is usable in a design rule for verifying acceptability of the electrical connection from the outer part 525*o* to the rearranged inner part 525*ib*.

As illustrated at the bottom view in FIG. 5, a reconnecting operation is performed by the APR tool to reconnect the corresponding rearranged inner part and outer part which were previously disconnected and moved away from each other due to the scaling-up of the circuit region 410. In the example configuration in FIG. 5, the electrical connection between the rearranged inner part 525*ib* and outer part 525*o* satisfies a DRC verification, and requires no additional routing feature for reconnection. However, the pair of rearranged inner part 531*ib* and outer part 531*o*, and the pair of rearranged inner part 534*ib* and outer part 534*o* require additional routing features for reconnection. For example, to reconnect the rearranged inner part 534*ib* and outer part 534*o*, the APR tool extends the outer part 534*o* into the scaled-up circuit region 510*b*, adds a conductive pattern 546 overlapping both the extended outer part 534*o* and the rearranged inner part 534*ib*, and adds vias 547, 548 electrically coupling the conductive pattern 546 correspondingly to the extended outer part 534*o* and the rearranged inner part 534*ib*. As a result, the outer part 534*o* is reconnected to the rearranged inner part 534*ib*, and then to the corresponding conductive pattern 409*b* through the via 419*b*. In at least one embodiment, the arranged inner part 531*ib* and outer part 531*o* are reconnected in a similar manner, and additional routing features for reconnecting the arranged inner part 531*ib* and outer part 531*o* are omitted from FIG. 5 for simplicity. Upon completion of the reconnecting operation, a modified layout 550 with the scaled-up circuit region 510*b* and satisfying various verifications is obtained.

Figure 6:
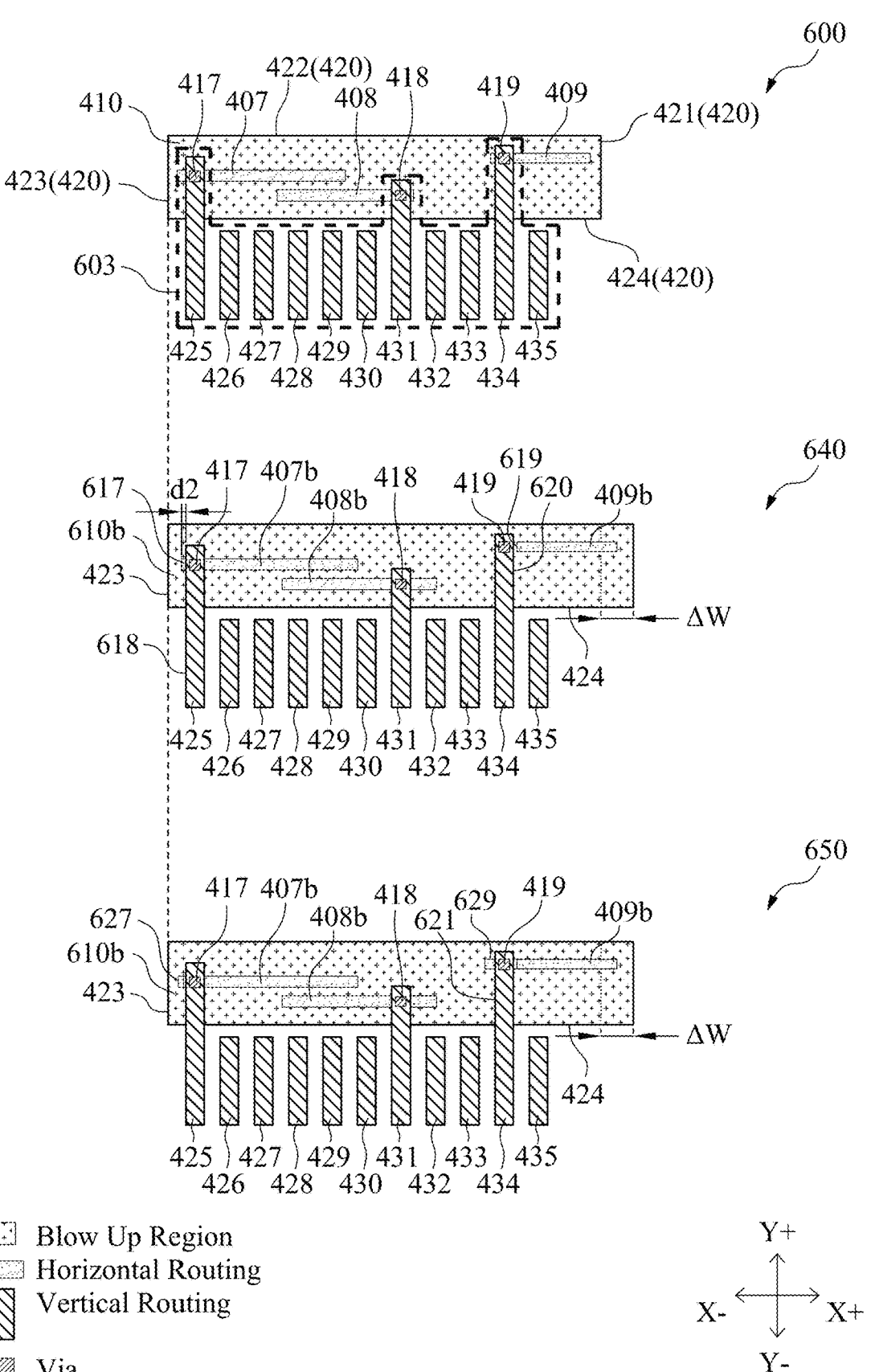
FIG. 6 includes schematic views of an IC layout in a scaling operation with a fixed area, in accordance with some embodiments.

FIG. 6 includes schematic views of an IC layout 600 in a scaling operation with a fixed area, in accordance with some embodiments. In some embodiments, the IC layout 600 corresponds to the IC layout 400. Elements in FIG. 6 having corresponding elements in FIG. 4 are designated by the same reference numerals. In FIG. 6, the top view shows the IC layout 600 with a fixed area 603 before scaling the circuit region 410 contained in the IC layout 600, the middle view shows an intermediate layout 640 with the circuit region 410 after scaling and some routing modification, and the bottom view shows a modified layout 650 after further routing modification.

As illustrated in the top view of FIG. 6, the IC layout 600 comprises the circuit region 410, as described with respect to FIG. 4. A difference between the top views in FIG. 4 and in FIG. 6 is that, in FIG. 6, a fixed area 603 is set to include the conductive patterns 425-435 adjacent the circuit region 410 and comprising conductive patterns 425, 431, 434 extending from outside into the circuit region 410. In some embodiments, a fixed area is set by a user. For example, a layout engineer uses a marker layer to cover an area to be set as a fixed area. In the example configuration in FIG. 6, the boundary of the fixed area 603 corresponds to the marker layer. In some embodiments, a power/ground network, or a portion thereof, in a layout is set as one or more fixed areas.

In some embodiments, a fixed area is set automatically by a processor, an APR tool, or an external computer system.

For example, machine learning is used in one or more embodiments to learn from teaching data including past user inputs in various situations when fixed areas were set or were not set. In some embodiments, a result of the machine learning includes a machine learned model and/or a trained neural network. The APR tool and/or an external computer system is/are configured to apply the machine learned model and/or the trained neural network to determine, in future situations, where one or more fixed areas are to be set, in addition to or in lieu of user input. Other arrangements for setting one or more fixed areas are within the scopes of various embodiments.

A fixed area indicates to the APR tool the area where scaling is not to be formed. Thus, even though parts of the conductive patterns 425, 431, 434 and the corresponding vias 417, 418, 419 are included in the circuit region 410, the conductive patterns 425, 431, 434 and the corresponding vias 417, 418, 419 are not affected by the scaling operation of the circuit region 410. In other words, the fixed area 603 in the memory device 600 is not scaled or moved, despite scaling operations of one or more circuit regions.

As illustrated in the middle view of FIG. 6, the circuit region 410 is scaled-up along the X+ direction, resulting in a scaled-up circuit region 610*b*. In some embodiments, circuit region 410 is scaled-up in accordance with a new gate pattern pitch and routing modifications are made, as described with respect to FIG. 2B. A size of the scaled-up circuit region 610*b* along the X-axis corresponds to a size of the circuit region 410 along the X-axis increased by ΔW. When the circuit region 410 is scaled-up, corresponding horizontal routing is stretched along the X-axis, while vias and vertical routing are rearranged, e.g., spread out, along the X-axis and in accordance with the scaling factor, as described with respect to FIG. 2B. However, because the vertical routing and vias, i.e., the conductive patterns 425, 431, 434 and the corresponding vias 417, 418, 419, are included in the fixed area 603, the conductive patterns 425, 431, 434 and the corresponding vias 417, 418, 419 are not affected in by the scaling-up of the circuit region 410, are not rearranged or moved as described with respect to FIGS. 4-5, and remain in the same positions as at the top view in FIG. 6. As a result of the setting of the fixed area 603 and the scaling-up of the circuit region 410, an intermediate layout 640 is obtained as illustrated at the middle view in FIG. 6.

The intermediate layout 640 is reviewed by a user and/or subject to various verifications, such as DRC and LVS verifications. In the example configuration in FIG. 6, a DRC verification recognizes that the distance d2 between the edge 617 of the conductive patterns 407*b* and the adjacent edge 618 of the conductive pattern 425 is smaller than a minimal distance permitted by a design rule. A similar DRC violation exists between the edge 619 of the conductive patterns 409*b* and the adjacent edge 620 of the conductive pattern 434. There is an open circuit between the conductive patterns 409*b* and the conductive pattern 434 which are supposed to be electrically connected with each other as in the initial circuit region 410. This issue is an LVS violation.

As illustrated at the bottom view in FIG. 6, routing modification including a reconnecting operation is performed by the APR tool to resolve the DRC and/or LVS violations found in the intermediate layout 640. For example, to resolve the DRC violation related to the too small distance d2, an additional routing feature, i.e., horizontal routing 627 is added to the edge 617 of the conductive patterns 407*b* to extend the conductive patterns 407*b* in the X− direction. To resolve the DRC and LVS violations related to the open circuit at the edge 619, an additional routing feature, i.e., horizontal routing 629 is added to the edge 619 of the conductive patterns 409*b* to extend the conductive patterns 409*b* in the X– direction to pass under the via 419 for electrical connection with the conductive pattern 434 for satisfying the related LVS requirement, and to also protrude beyond the opposite edge 621 of the conductive pattern 434 by a sufficient distance for satisfying the related DRC rule. Upon completion of the routing modification with the reconnecting operation, a modified layout 650 with the scaled-up circuit region 610*b* and satisfying various verifications is obtained.

Figure 7:
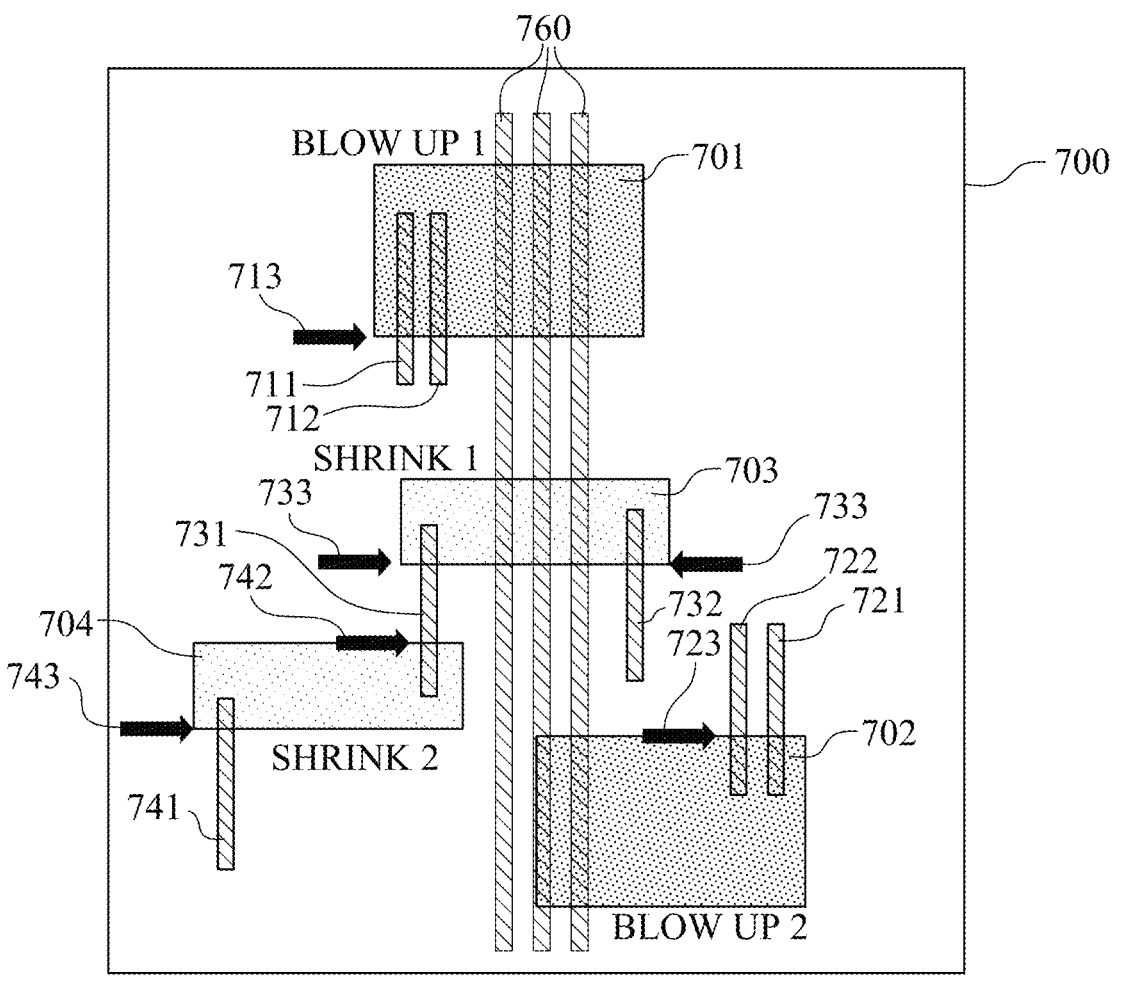
FIG. 7 is a schematic view of circuit regions of an IC layout in a disconnecting operation with one or more fixed features, in accordance with some embodiments.

FIG. 7 is a schematic view of circuit regions of an IC layout 700 in a disconnecting operation with one or more fixed features, in accordance with some embodiments.

In the example configuration in FIG. 7, the IC layout 700 comprises circuit regions 701, 702, 703, 704 corresponding to circuit regions 201, 202, 203, 204 in the IC layout 200. The IC layout 700 further comprises various conductive patterns extending in and out the circuit regions 701, 702, 703, 704 across the corresponding boundaries (not numbered) of the circuit regions. As described with respect to FIG. 5, disconnecting operations are performed along the boundaries of the circuit regions before the circuit regions are scaled. For example, a disconnecting operation is performed to disconnect conductive patterns 711, 712 extending into the circuit region 701, as schematically illustrated by arrow 713. A disconnecting operation is performed to disconnect conductive patterns 721, 722 extending into the circuit region 702, as schematically illustrated by arrow 723. A disconnecting operation is performed to disconnect conductive patterns 731, 732 extending into the circuit region 703, as schematically illustrated by arrows 733. A disconnecting operation is performed to disconnect conductive patterns 731, 741 extending into the circuit region 704, as schematically illustrated by arrows 742, 743.

The IC layout 700 further comprises fixed features. In some embodiments, a fixed feature is any feature included in a fixed area or otherwise marked as fixed as described with respect to FIG. 6. Example fixed features include, but are not limited to, conductive patterns, vias, circuit elements (devices), nets, cells, or the like. In the example configuration in FIG. 7, the fixed features include conductive patterns 760 and corresponding vias (not shown) electrically coupling the conductive patterns to other devices and/or conductive patterns. The fixed conductive patterns 760 extend across the boundaries of one or more circuit regions, such as the circuit regions 701, 702, 703. The fixed conductive patterns 760 are not affected by various scaling operations in the circuit regions 701, 702, 703, and are further not affected by the disconnecting operations along the boundaries of the circuit regions. For example, although the fixed conductive patterns 760 extend across the boundaries of the circuit regions 701, 702, 703, the fixed conductive patterns 760 are not disconnected by various disconnecting operations schematically illustrated by arrows 713, 723, 733. In other words, the disconnecting operations are performed along the boundaries of the circuit regions without disconnecting fixed features.

After performing the disconnecting operations without disconnecting the fixed features, various scaling operations are performed for scaling up the circuit regions 701, 702 and scaling down the circuit regions 703, 704, for example, as described with respect to FIGS. 2B-2C. As a result of the scaling operations, various conductive patterns and vias in the circuit regions 701-704, except for the fixed conductive patterns 760, are rearranged and/or resized, for example, as described with respect to FIGS. 2A-2B, 5, 6. Subsequently, various routing modifications, including reconnecting operations, are performed to restore electrical connections between a fixed feature and a corresponding feature in a scaled circuit region and/or between disconnected parts of an initial conductive pattern, as described with respect to FIGS. 5-6. As a result, it is possible to obtain a modified layout with circuit regions each being individually scaled for optimal yield and/or performance, while satisfying various design rules and requirements.

In some embodiments, a layout is modified by scaling up (or blowing up) or scaling down (or shrinking) one or more regions of the layout. Properties PUSH and/or FIXED are assigned, e.g., by and/or in an APR tool, to correspondingly set pushed and/or fixed areas. A fixed area overlapping a region to be scaled will not be scaled or moved when the region is scaled. A pushed area associated with, but outside, the region to be scaled will be pushed, or moved, by a distance and/or in a direction corresponding to the scaling operation. Commands CHOP and RE-CONNECT are correspondingly performed, e.g., by the APR tool, before and after scaling to provide various ways to achieve local scaling. In one or more embodiments, examples of property PUSH are described with respect to FIGS. 3A and 3B, examples of property FIXED are described with respect to FIGS. 6 and 7, examples of command CHOP (i.e., disconnect) are described with respect to FIGS. 5 and 7, and examples of command RE-CONNECT are described with respect to FIGS. 4, 5 and 6.

Figure 8A:
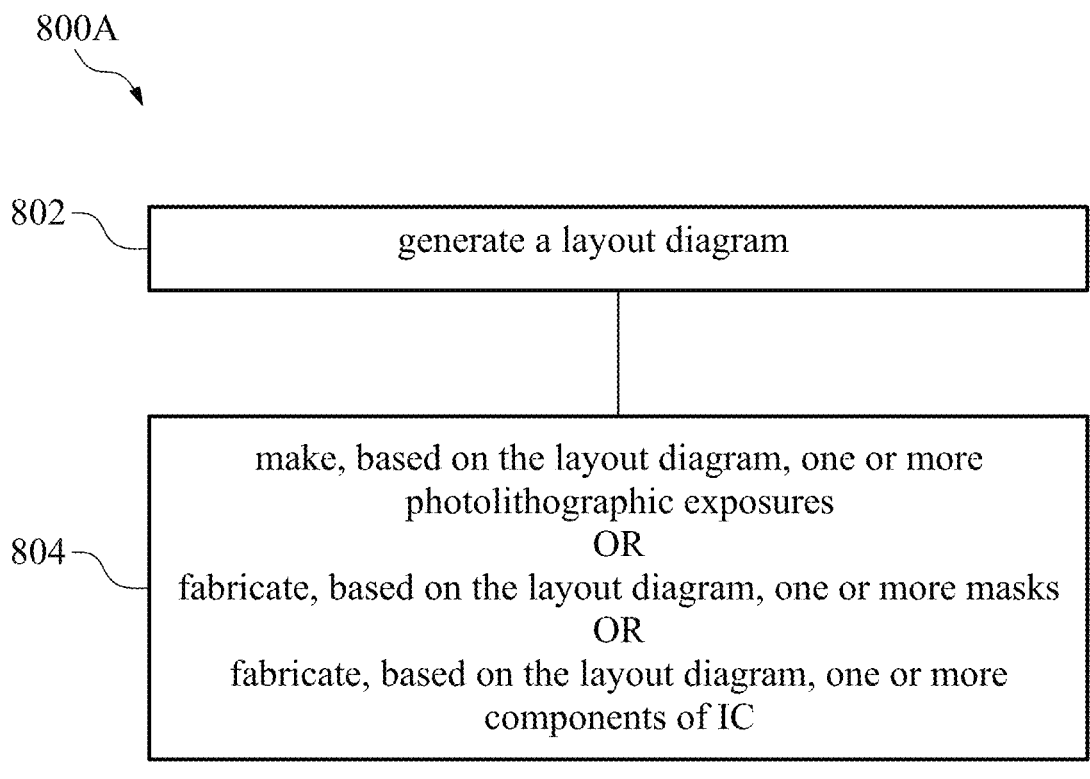
FIG. 8A-8B are flow charts of various methods, in accordance with some embodiments.

FIG. 8A is a flowchart of a method 800A of manufacturing a semiconductor device or IC, in accordance with some embodiments.

Method 800A is implementable, for example, using EDA system 900 (FIG. 9, discussed below) and an integrated circuit (IC), manufacturing system 1000 (FIG. 10, discussed below), in accordance with some embodiments. Examples of a semiconductor device which can be manufactured according to method 800 include IC 250 of FIG. 2D, ICs corresponding to various layouts disclosed herein, or the like.

In FIG. 8A, method 800A includes operations 802, 804. At operation 802, a layout diagram is generated which, among other things, includes one or more of layout diagrams disclosed herein, or the like. Operation 802 is implementable, for example, using EDA system 1000 (FIG. 10, discussed below), in accordance with some embodiments. In some embodiments, the generated layout includes at least one circuit region individually or locally scaled, as described herein. From operation 802, flow proceeds to operation 804.

At operation 804, based on the layout diagram, at least one of (A) one or more photolithographic exposures are made or (B) one or more semiconductor masks are fabricated or (C) one or more components in a layer of a semiconductor device are fabricated, as described herein below with respect to FIG. 10.

Figure 8B:
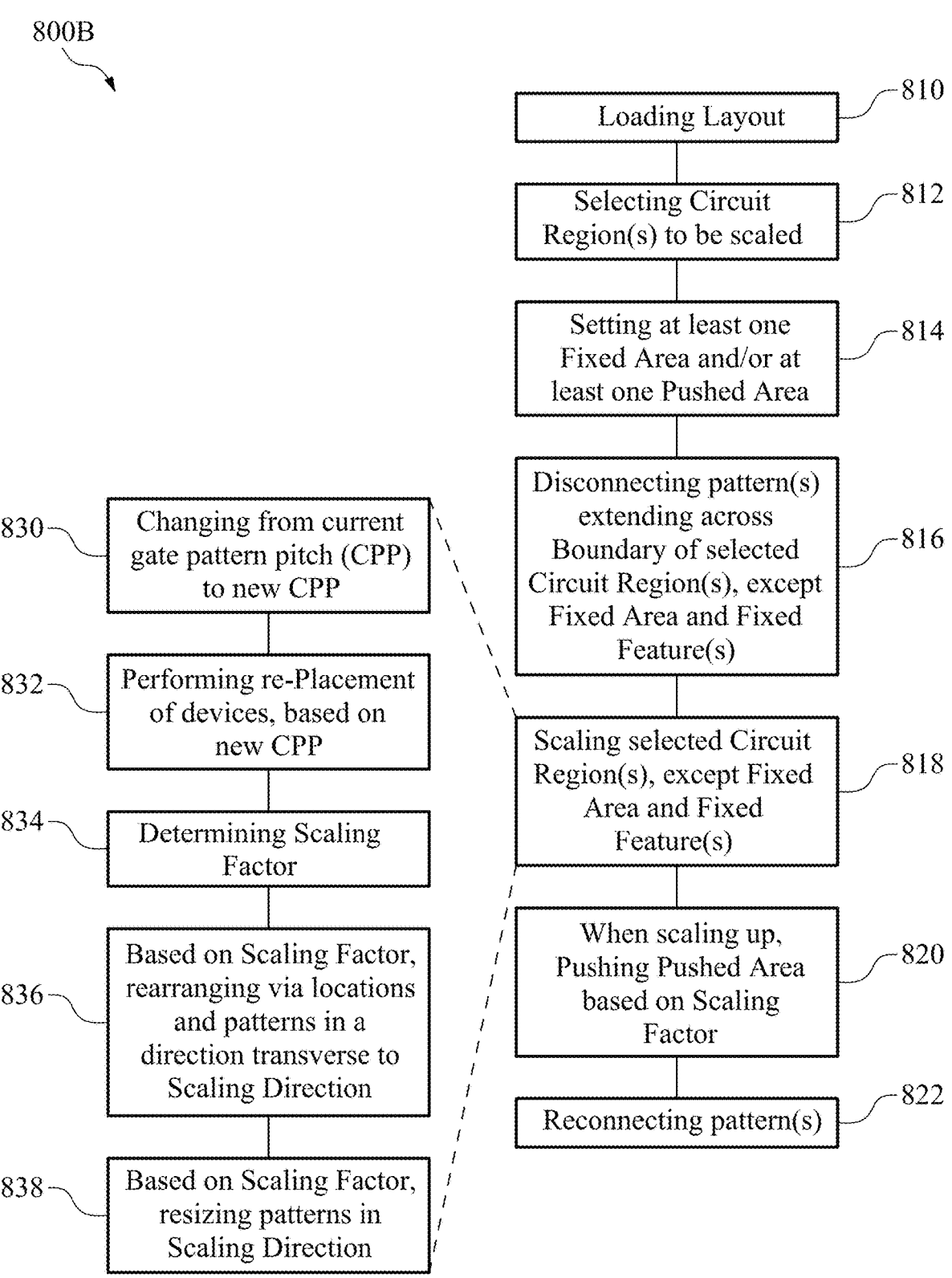

FIG. 8B is a flowchart of a method 800B of generating a layout, in accordance with some embodiments. More particularly, the flowchart of FIG. 8B shows additional operations that demonstrates one example of procedures implementable in operation 802 of FIG. 8A, in accordance with one or more embodiments. In at least one embodiment, method 800B is performed by an APR tool. In FIG. 8B, method 800B includes operations 810-824 among which operation 818 includes operations 830-838.

At operation 810, a layout is loaded, e.g., into an APR tool. In some embodiments, the layout is generated in an IC design flow as described with respect to FIG. 1. In some embodiments, the layout is an preexisting layout loaded from a non-transitory, computer-readable storage medium. From operation 810, flow proceeds to operation 812.

At operation 812, one or more circuit regions in the layout are selected for scaling. In some embodiments, the circuit regions are selected automatically and/or based on user input. In at least one embodiment, the selected circuit regions are highlighted, e.g., on a screen of a display device, to help a user to quickly and/or easily to see the circuit region(s) selected to be scaled, whether the selected circuit regions are to be scaled up or down, and to provide appropriate user inputs and/or correction when prompted by and/or requested by the automated system, e.g., an APR tool. Examples of various circuit regions selected for scaling in a layout are described with respect to FIGS. 2A and 7. From operation 812, flow proceeds to operation 814.

At operation 814, at least one fixed area and/or at least one pushed area is/are set. A fixed area or a fixed feature is not to be scaled or disconnected even if the fixed area or fixed feature is inside a scaled circuit region. A pushed area is to be pushed or shifted by a distance corresponding to a scaling factor of a scaled circuit region, even if the pushed area is outside the scaled circuit region. Examples of pushed areas are described with respect to FIGS. 3A-3B. Examples of fixed areas and/or fixed features are described with respect to FIGS. 6-7. In at least one embodiment, a fixed area and/or a pushed area is/are set by a user. It is within the scope of various embodiments that a fixed area and/or a pushed area is/are automatically set by an automated system, APR tool or computer system, as described herein. In at least one embodiment, "pushed area" and "fixed area" are properties or flags set by a user or automatically to guide subsequent operations of an automated system, e.g., an APR tool. In at least one embodiment, a pushed area and/or a fixed area is/are set by using one or more marker layers arranged over the areas to be pushed or fixed. In some embodiments, operation 814 is omitted. From operation 814, flow proceeds to operation 816.

At operation 816, one or more conductive patterns that extend across the boundary of the selected circuit region are disconnected along the boundary, without disconnecting an associated fixed area and/or one or more fixed features crossing the boundary. Example disconnecting operations are described with respect to FIGS. 5, 7. In some embodiments, a user sets whether a disconnecting operation is to be performed for a selected circuit region. It is within the scope of various embodiments that a disconnecting operation is automatically performed by an automated system, APR tool or computer system, as described herein. In some embodiments, operation 816 is omitted. From operation 816, flow proceeds to operation 818.

At operation 818, the selected circuit region is scaled, without scaling an associated fixed area and/or one or more fixed features inside the scaled circuit region. Example scaling operations are described with respect to FIGS. 2B-2C, 3A-6, and are automatically performed by an automated system, or an APR tool. An example scaling operation without scaling a fixed area or fixed features is described with respect to FIG. 6. The operation 818 is described in further details herein. From operation 818, flow proceeds to operation 820.

At operation 820, when a pushed area is set at operation 814, the scaling operation is a scaling-up operation, and the pushed area overlaps the scaled circuit region along the scaling direction, the APR tool pushes or shifts the pushed area along the scaling direction by a distance, e.g., ΔW, corresponding to a scaling factor. In some embodiments, a pushed area is pushed by an accumulative distance corresponding to a sum of size increases of various scaled circuit regions. Example pushing operations are described with respect to FIGS. 3A-3B. In some embodiments, e.g., when a pushed area is not set at operation 814, operation 820 is omitted. From operation 820, flow proceeds to operation 822.

At operation 822, a reconnecting operation is performed by an APR tool to reconnect conductive patterns previously disconnected at operation 816, and/or to reconnect a fixed feature with a corresponding feature in the scaled circuit region, and/or to reconnect features initially electrically coupled together but are disconnected due to the scaling operation. In some embodiments, a reconnecting operation is performed in response to a verification result returned from a DRC and/or LVS verification. In at least one embodiment, a reconnecting operation includes adjusting an existing routing feature and/or adding at least one additional routing feature. Example reconnecting operations are described with respect to FIGS. 4-6. A modified layout obtained from operation 822 is subject to one or more verifications as described with respect to FIG. 1, and is signed off for manufacturing when the verifications are satisfied.

The scaling operation at operation 818 includes operations 830-838. Example scaling operations are described with respect to FIGS. 2B-2C, 4-6.

At operation 830, a new gate pattern pitch CPP different from the current gate pattern pitch CPP of the layout is received. In some embodiments, the new CPP is user input. In at least one embodiment, the new CPP is automatically generated or determined. From operation 830, flow proceeds to operation 832.

At operation 832, the APR tool performs re-placement of devices in accordance with the new CPP. From operation 832, flow proceeds to operation 834.

At operation 834, the scaling factor is determined. In some embodiments, the scaling factor is a ratio of the new CPP to the current CPP. Based on the scaling factor, it is possible to determine a change in the size of the scaled circuit region. In at least one embodiment, when the scaling operation is a scaling-up operation, a size increase ΔW of the scaled circuit region is used as the distance for pushing a pushed area further along the scaling direction, as described with respect to operation 820. From operation 834, flow proceeds to operation 836.

At operation 836, based on the scaling factor, the APR tool rearranges via locations and conductive patterns in a direction transverse to the scaling direction. For example, when the scaling direction is along the X-axis, via locations and vertical routing (conductive patterns elongated along the Y-axis) are rearranged along the X-axis. Example rearrangements of vias and vertical routing are described with respect to FIGS. 2B-2C, 4-6. From operation 836, flow proceeds to operation 838.

At operation 838, based on the scaling factor, the APR tool resizes conductive patterns elongated along the scaling direction, i.e., horizontal routing. Examples of resizing are described with respect to FIGS. 2B-2C. From operation 838, flow returns to operation 818, or proceeds to operation 820. In some embodiments, one or more advantages described here are achievable by a modified layout obtained from the method 800B or by a corresponding manufactured IC.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, at least one method(s) discussed herein is performed in whole or in part by at least one EDA system. In some embodiments, an EDA system is usable as part of a design house of an IC manufacturing system discussed below.

Figure 9:
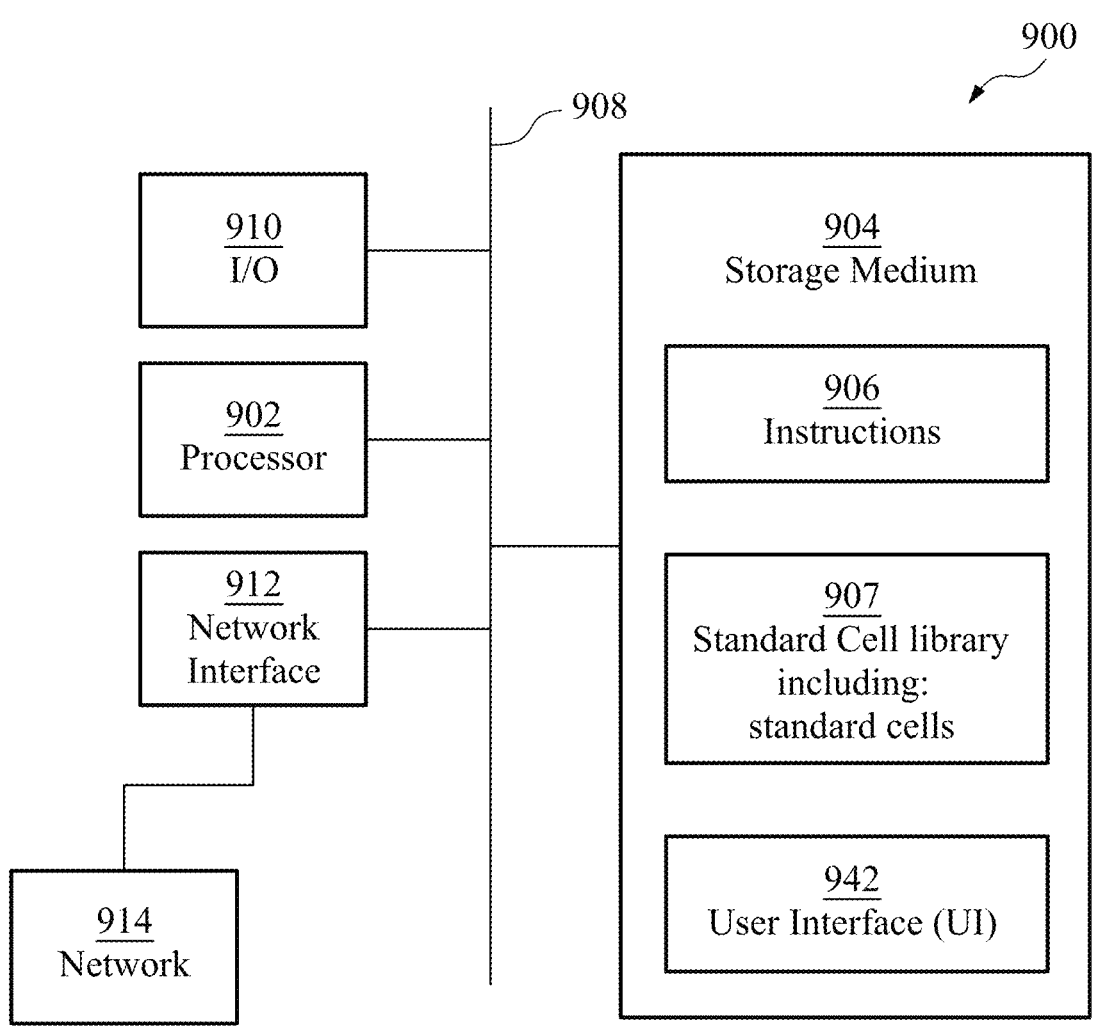
FIG. 9 is a block diagram of an electronic design automation (EDA) system, in accordance with some embodiments.

FIG. 9 is a block diagram of an electronic design automation (EDA) system 900 in accordance with some embodiments.

In some embodiments, EDA system 900 includes an automatic placement and routing (APR) system. Methods described herein of designing layout diagrams represent wire routing arrangements, in accordance with one or more embodiments, are implementable, for example, using EDA system 900, in accordance with some embodiments.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) an EDA tool which implements a portion or all of the methods described herein in accordance with one or more embodiments (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause system 900 (where such execution represents (at least in part) the EDA tool) to be usable for performing a portion or all of the noted processes and/or methods. In one or more embodiments, storage medium 904 also stores information which facilitates performing a portion or all of the noted processes and/or methods. In one or more embodiments, storage medium 904 stores library 907 of standard cells including such standard cells as disclosed herein. In one or more embodiments, storage medium 904 stores one or more layout diagrams 909 corresponding to one or more layouts disclosed herein.

EDA system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

EDA system 900 also includes network interface 912 coupled to processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-2164. In one or more embodiments, a portion or all of noted processes and/or methods, is implemented in two or more systems 900.

System 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. EDA system 900 is configured to receive information related to a UI through I/O interface 910. The information is stored in computer-readable medium 904 as user interface (UI) 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 10:
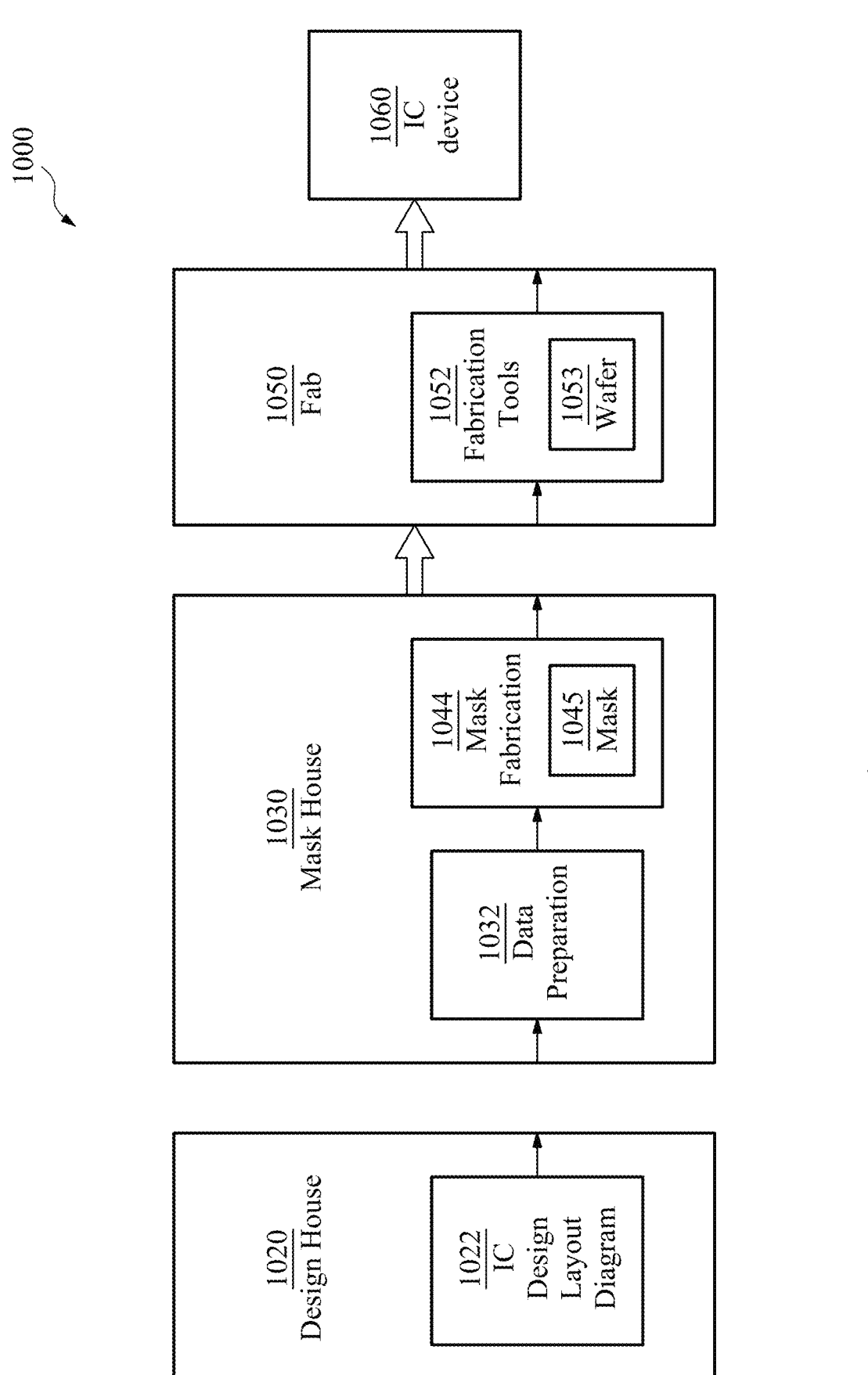
FIG. 10 is a block diagram of an IC manufacturing system and an IC manufacturing flow associated therewith, in accordance with some embodiments.

FIG. 10 is a block diagram of an integrated circuit (IC) manufacturing system 1000, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1000.

In FIG. 10, IC manufacturing system 1000 includes entities, such as a design house 1020, a mask house 1030, and an IC manufacturer/fabricator (fab) 1050, that interact with one another in the design, development, and manufacturing cycles and/or services related to manufacturing an IC 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1030, and IC fab 1050 is owned by a single larger company. In some embodiments, two or more of design house 1020, mask house 1030, and IC fab 1050 coexist in a common facility and use common resources.

Design house (or design team) 1020 generates an IC design layout diagram 1022. IC design layout diagram 1022 includes various geometrical patterns designed for an IC 1060. The geometrical patterns correspond to patterns of metal, oxide, or semiconductor layers that make up the various components of IC 1060 to be fabricated. The various layers combine to form various IC features. For example, a portion of IC design layout diagram 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout diagram 1022. The design procedure includes one or more of logic design, physical design or place and route. IC design layout diagram 1022 is presented in one or more data files having information of the geometrical patterns. For example, IC design layout diagram 1022 can be expressed in a GDSII file format or DFII file format.

Mask house 1030 includes data preparation 1032 and mask fabrication 1044. Mask house 1030 uses IC design layout diagram 1022 to manufacture one or more masks 1045 to be used for fabricating the various layers of IC 1060 according to IC design layout diagram 1022. Mask house 1030 performs mask data preparation 1032, where IC design layout diagram 1022 is translated into a representative data file (RDF). Mask data preparation 1032 provides the RDF to mask fabrication 1044. Mask fabrication 1044 includes a mask writer. A mask writer converts the RDF to an image on a substrate, such as a mask (reticle) 1045 or a semiconductor wafer 1053. The design layout diagram 1022 is manipulated by mask data preparation 1032 to comply with particular characteristics of the mask writer and/or requirements of IC fab 1050. In FIG. 10, mask data preparation 1032 and mask fabrication 1044 are illustrated as separate elements. In some embodiments, mask data preparation 1032 and mask fabrication 1044 can be collectively referred to as mask data preparation.

In some embodiments, mask data preparation 1032 includes optical proximity correction (OPC) which uses lithography enhancement techniques to compensate for image errors, such as those that can arise from diffraction, interference, other process effects and the like. OPC adjusts IC design layout diagram 1022. In some embodiments, mask data preparation 1032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1032 includes a mask rule checker (MRC) that checks the IC design layout diagram 1022 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1022 to compensate for photolithographic implementation effects during mask fabrication 1044, which may undo part of the modifications performed by OPC in order to meet mask creation rules.

In some embodiments, mask data preparation 1032 includes lithography process checking (LPC) that simulates processing that will be implemented by IC fab 1050 to fabricate IC 1060. LPC simulates this processing based on IC design layout diagram 1022 to create a simulated manufactured device, such as IC 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1022.

It should be understood that the above description of mask data preparation 1032 has been simplified for the purposes of clarity. In some embodiments, data preparation 1032 includes additional features such as a logic operation (LOP) to modify the IC design layout diagram 1022 according to manufacturing rules. Additionally, the processes applied to IC design layout diagram 1022 during data preparation 1032 may be executed in a variety of different orders.

After mask data preparation 1032 and during mask fabrication 1044, a mask 1045 or a group of masks 1045 are fabricated based on the modified IC design layout diagram 1022. In some embodiments, mask fabrication 1044 includes performing one or more lithographic exposures based on IC design layout diagram 1022. In some embodiments, an electron-beam (e-beam) or a mechanism of multiple e-beams is used to form a pattern on a mask (photomask or reticle) 1045 based on the modified IC design layout diagram 1022. Mask 1045 can be formed in various technologies. In some embodiments, mask 1045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1045 includes a transparent substrate (e.g., fused quartz) and an opaque material (e.g., chromium) coated in the opaque regions of the binary mask. In another example, mask 1045 is formed using a phase shift technology. In a phase shift mask (PSM) version of mask 1045, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in semiconductor wafer 1053, in an etching process to form various etching regions in semiconductor wafer 1053, and/or in other suitable processes.

IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 includes fabrication tools 1052 configured to execute various manufacturing operations on semiconductor wafer 1053 such that IC 1060 is fabricated in accordance with the mask(s), e.g., mask 1045. In various embodiments, fabrication tools 1052 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1050 uses mask(s) 1045 fabricated by mask house 1030 to fabricate IC 1060. Thus, IC fab 1050 at least indirectly uses IC design layout diagram 1022 to fabricate IC 1060. In some embodiments, semiconductor wafer 1053 is fabricated by IC fab 1050 using mask(s) 1045 to form IC 1060. In some embodiments, the IC fabrication includes performing one or more lithographic exposures based at least indirectly on IC design layout diagram 1022. Semiconductor wafer 1053 includes a silicon substrate or other proper substrate having material layers formed thereon. Semiconductor wafer 1053 further includes one or more of various doped regions, dielectric features, multilevel interconnects, and the like (formed at subsequent manufacturing steps).

In some embodiments, a method of modifying a layout for an integrated circuit (IC) comprises: selecting, in the layout, a circuit region to be scaled; setting a fixed area including a fixed feature in the selected circuit region; and scaling the selected circuit region, without scaling the fixed area including the fixed feature, to obtain a modified layout for the IC.

In some embodiments, a system for modifying a layout for an integrated circuit (IC) comprises a processor, and a non-transitory computer readable storage medium connected to the processor, wherein the processor is configured to execute instructions stored on the computer readable storage medium. The processor selects, in the layout, a circuit region to be scaled along a first direction, and disconnects a first conductive pattern, which extends in a second direction transverse to the first direction and across a boundary of the selected circuit region, into an inner part in the selected circuit region and an outer part outside the selected circuit region. The processor scales the selected circuit region along the first direction, and reconnects the inner part in the scaled circuit region and the outer part, in response to at least one of a first determination that the inner part in the scaled circuit region and the outer part are electrically disconnected from each other, or a second determination that at least one of the inner part in the scaled circuit region or the outer part fails a verification.

In some embodiments, a computer program product comprises a non-transitory, computer-readable medium containing instructions therein. The instructions, when executed, cause the processor to perform selecting, in a layout for an integrated circuit (IC), a circuit region to be scaled along a first direction. The selected circuit region comprises: devices having a plurality of gate patterns arranged at a first gate pattern pitch along the first direction, first conductive patterns extending along the first direction, second conductive patterns extending along a second direction transverse to the first direction, and vias. The processor is further caused to perform scaling the selected circuit region along the first direction without changing a gate pattern width of the plurality of gate patterns to obtain a modified layout. The scaling comprises performing re-placement of the devices with the plurality of gate patterns arranged at a second gate pattern pitch along the first direction, the second gate pattern pitch different from the first gate pattern pitch, rearranging one or more of the second conductive patterns and the vias along the first direction, based on a scaling factor being a ratio of the second gate pattern pitch to the first gate pattern pitch, and resizing one or more of the first conductive patterns along the first direction, based on the scaling factor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of modifying a layout for an integrated circuit (IC), said method comprising:
    selecting, in the layout, a circuit region to be scaled;
    setting a fixed area including a fixed feature in the selected circuit region; and
    scaling the selected circuit region, without scaling the fixed area including the fixed feature, to obtain a modified layout for the IC,
    wherein
    said scaling comprises scaling the selected circuit region by a scaling factor along a first direction,
    said setting further comprises setting, as a pushed area, an area overlapping the selected circuit region along the first direction, and
    said method further comprises moving the pushed area along the first direction by a distance corresponding to a width of the selected circuit region and the scaling factor.

2. The method of claim 1, wherein
    said scaling comprises changing, by the scaling factor, a gate pattern pitch between adjacent gate patterns among a plurality of gate patterns in the selected circuit region.

3. The method of claim 1, wherein
    said scaling comprises changing, by the scaling factor, a gate pattern pitch between adjacent gate patterns among a plurality of gate patterns in the selected circuit region, without changing a gate pattern width of the plurality of gate patterns.

4. The method of claim 1, further comprising:
    performing a verification on the modified layout, the verification comprising at least one of:
        a design rule check, or
        a layout-versus-schematic (LVS) check.

5. The method of claim 1, wherein said selecting further comprises selecting, in the layout, a further circuit region to be scaled, the pushed area overlaps both the selected circuit region and further circuit region along the first direction, said scaling comprises:

scaling-up the selected circuit region by the scaling factor along the first direction, and scaling-up the selected further circuit region by a further scaling factor along the first direction, and said moving comprises:

pushing the pushed area along the first direction by the distance corresponding to the width of the selected circuit region and the scaling factor, and further pushing the pushed area along the first direction by a further distance corresponding to a width of the selected further circuit region and the further scaling factor.

6. The method of claim 1, wherein the fixed feature comprises a conductive pattern extending across a boundary of the selected circuit region.

7. The method of claim 1, further comprising:

after said scaling, adding or modifying at least one routing feature to at least one of restore an electrical connection between the fixed feature and a corresponding feature in the scaled circuit region, or satisfy a design rule.

8. The method of claim 1, wherein the selected circuit region comprises:

devices placed at a first gate pattern pitch along the first direction, first conductive patterns extending along the first direction, second conductive patterns extending along a second direction transverse to the first direction, and vias, and said scaling comprises:

performing re-placement of the devices at a second gate pattern pitch along the first direction, the second gate pattern pitch different from the first gate pattern pitch, rearranging one or more of the second conductive patterns and the vias along the first direction, based on the scaling factor being a ratio of the second gate pattern pitch to the first gate pattern pitch, and resizing one or more of the first conductive patterns along the first direction, based on the scaling factor.

9. The method of claim 1, wherein the layout comprises a conductive pattern extending in a second direction transverse to the first direction and across a boundary of the selected circuit region, and said method further comprises:

before said scaling, disconnecting the conductive pattern into an inner part in the selected circuit region and an outer part outside the selected circuit region, and after said scaling, reconnecting the inner part in the scaled circuit region and the outer part.

10. The method of claim 9, wherein said reconnecting comprises at least one of extending the outer part into the scaled circuit region to overlap the inner part, or adding at least one routing feature.

11. A system for modifying a layout for an integrated circuit (IC), said system comprising:

at least one processor; and a non-transitory computer readable storage medium connected to the processor, wherein the processor is configured to execute instructions stored on the computer readable storage medium to:

select, in the layout, a circuit region to be scaled along a first direction, disconnect a first conductive pattern, which extends in a second direction transverse to the first direction and across a boundary of the selected circuit region, into an inner part in the selected circuit region and an outer part outside the selected circuit region, scale the selected circuit region along the first direction, and reconnect the inner part in the scaled circuit region and the outer part, in response to at least one of a first determination that the inner part in the scaled circuit region and the outer part are electrically disconnected from each other, or a second determination that at least one of the inner part in the scaled circuit region or the outer part fails a verification.

12. The system of claim 11, wherein the at least one processor is further configured to execute instructions stored on the computer readable storage medium to:

perform the verification which comprises at least one of a design rule check, or a layout-versus-schematic (LVS) check.

13. The system of claim 11, wherein the at least one processor is further configured to execute instructions stored on the computer readable storage medium to:

make no attempt to reconnect the inner part in the scaled circuit region and the outer part, in response to a third determination that the inner part in the scaled circuit region and the outer part overlap each other over a distance greater than a predetermined minimal conductive pattern width.

14. The system of claim 11, wherein the at least one processor is further configured to execute instructions stored on the computer readable storage medium to:

reconnect the inner part in the scaled circuit region and the outer part by at least one of extending the outer part into the scaled circuit region to overlap the inner part, or adding at least one routing feature.

15. The system of claim 11, wherein the at least one processor is further configured to execute instructions stored on the computer readable storage medium to:

before disconnecting the first conductive pattern, set a first anchor on the inner part and a second anchor on the outer part, after scaling the selected circuit region, make at least one of the first determination or the second determination, based on a first coordinate of the first anchor on the inner part in the scaled circuit region and a second coordinate of the second anchor on the outer part.

16. The system of claim 11, wherein the at least one processor is further configured to execute instructions stored on the computer readable storage medium to:

in response to setting of a fixed area in the layout, the fixed area comprising a second conductive pattern which extends in the second direction across the boundary of the selected circuit region, not disconnect the second conductive pattern, and scale the selected circuit region, without scaling the fixed area.

17. The system of claim 11, wherein the at least one processor is further configured to execute instructions stored on the computer readable storage medium to:

in response to setting of a pushed area in the layout, the pushed area overlapping the selected circuit region along the first direction, scale-up the selected circuit region by a scaling factor, and push the pushed area along the first direction by a distance corresponding to a width of the selected circuit region and the scaling factor.

18. A computer program product, comprising a non-transitory, computer-readable medium containing instructions therein which, when executed by a processor, cause the processor to perform:

selecting, in a layout for an integrated circuit (IC), a circuit region to be scaled along a first direction, wherein the selected circuit region comprises:

devices having a plurality of gate patterns arranged at a first gate pattern pitch along the first direction, first conductive patterns extending along the first direction, second conductive patterns extending along a second direction transverse to the first direction, and vias; and scaling the selected circuit region along the first direction without changing a gate pattern width of the plurality of gate patterns to obtain a modified layout, wherein said scaling comprises performing re-placement of the devices with the plurality of gate patterns arranged at a second gate pattern pitch along the first direction, the second gate pattern pitch different from the first gate pattern pitch, rearranging one or more of the second conductive patterns and the vias along the first direction, based on a scaling factor being a ratio of the second gate pattern pitch to the first gate pattern pitch, and resizing one or more of the first conductive patterns along the first direction, based on the scaling factor.

19. The computer program product of claim 18, wherein at least one second conductive pattern among the second conductive patterns extends in the second direction across a boundary of the selected circuit region, and the instructions, when executed by the processor, further cause the processor to before said scaling, perform disconnecting the at least one second conductive pattern into an inner part in the selected circuit region and an outer part outside the selected circuit region, and after said scaling, perform routing to reconnect the inner part in the scaled circuit region and the outer part.

20. The computer program product of claim 19, wherein the instructions, when executed by the processor, further cause the processor to:

in response to setting of a fixed area in the layout, the fixed area comprising a fixed conductive pattern which extends in the second direction across the boundary of the selected circuit region, perform said disconnecting the at least one second conductive pattern without disconnecting the fixed conductive pattern, and perform said scaling the selected circuit region, without scaling the fixed area.

* * * * *